(12) United States Patent
Chun et al.

(10) Patent No.: US 8,249,047 B2
(45) Date of Patent: Aug. 21, 2012

(54) METHOD OF TRANSMITTING CONTROL SIGNAL IN WIRELESS COMMUNICATION SYSTEM

(75) Inventors: Jin-young Chun, Anyang-si (KR); Sung Ho Park, Anyang-si (KR); Hyunsoo Ko, Anyang-si (KR); Bin Chul Ihm, Anyang-si (KR); Young Seob Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 12/588,298

(22) Filed: Oct. 9, 2009

(65) Prior Publication Data

US 2010/0091680 A1 Apr. 15, 2010

Related U.S. Application Data

(60) Provisional application No. 61/104,270, filed on Oct. 10, 2008, provisional application No. 61/110,922, filed on Nov. 3, 2008, provisional application No. 61/151,524, filed on Feb. 11, 2009.

(30) Foreign Application Priority Data

Feb. 26, 2009 (KR) ........................ 10-2009-0016274

(51) Int. Cl.
*H04J 1/00* (2006.01)
(52) U.S. Cl. ........................................ 370/343
(58) Field of Classification Search .................. 370/310, 370/329, 330, 336, 337, 341, 343–345, 347, 370/348
See application file for complete search history.

(56) References Cited

U.S. PATENT DOCUMENTS

| | | | |
|---|---|---|---|
| 2005/0176474 A1 | 8/2005 | Lee et al. | |
| 2006/0013185 A1 | 1/2006 | Seo et al. | |
| 2006/0126554 A1 | 6/2006 | Motegi et al. | |
| 2006/0209732 A1 | 9/2006 | Gorokhov et al. | |
| 2007/0097927 A1* | 5/2007 | Gorokhov et al. | 370/335 |
| 2008/0089312 A1* | 4/2008 | Malladi | 370/345 |
| 2008/0165872 A1 | 7/2008 | Kwon et al. | |
| 2008/0181181 A1* | 7/2008 | Gorokhov et al. | 370/335 |
| 2010/0195609 A1* | 8/2010 | Li et al. | 370/329 |
| 2010/0272042 A1* | 10/2010 | Chun et al. | 370/329 |
| 2011/0149942 A1* | 6/2011 | Ko et al. | 370/343 |

FOREIGN PATENT DOCUMENTS

| | | |
|---|---|---|
| CN | 101170532 A | 4/2008 |
| KR | 10-2008-0048400 A | 6/2008 |
| RU | 2 321 970 C2 | 4/2008 |
| RU | 2 235 760 C1 | 5/2008 |
| RU | 2 333 604 C2 | 9/2008 |

\* cited by examiner

*Primary Examiner* — Kerri Rose
(74) *Attorney, Agent, or Firm* — McKenna Long & Aldridge LLP

(57) ABSTRACT

A method of transmitting a control signal in a wireless communication system includes receiving data or a control signal, and transmitting a feedback signal through a control channel in response to the data or the control signal, wherein the control channel comprises a plurality of mini-tiles in a plurality of tiles, each of which consists of at least one orthogonal frequency division multiplexing (OFDM) symbol in a time domain and at least one subcarrier in a frequency domain, and if the plurality of tiles have the same pilot pattern, the plurality of mini-tiles are cyclically selected from the plurality of tiles, and if the plurality of tiles have cyclically-arranged pilot patterns, the plurality of mini-tiles are selected at the same position from the plurality of tiles.

15 Claims, 29 Drawing Sheets

OFDM Symbol

Subcarrier

FFBCH for 1 UE

DRU

☐ Data subcarrier
▨ Pilot subcarrier

METHOD OF TRANSMITTING CONTROL SIGNAL IN WIRELESS COMMUNICATION SYSTEM

CROSS-REFERENCE TO RELATED APPLICATIONS

This application claims the benefit of priority of U.S. Provisional application Ser. No. 61/104,270 filed on Oct. 10, 2008, Ser. No. 61/110,922 filed on Nov. 3, 2008, No. 61/151, 524 filed on Feb. 11, 2009, and Korean Patent Application No. 10-2009-0016274 filed on Feb. 26, 2009 which are incorporated by reference in its entirety herein.

BACKGROUND

1. Technical Field

The present invention relates to wireless communications, and more particularly, to a method of transmitting a control signal through a control channel.

2. Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

Recently, standardization on the IEEE 802.16m is in progress as a new technical standard based on the IEEE 802.16e. The IEEE 802.16m, which is a newly developed technical standard, has to be designed to support the previously designed IEEE 802.16e. That is, a technology (i.e., IEEE 802.16m) of a newly designed system has to be configured to operate by effectively incorporating a conventional technology (i.e., IEEE 802.16e).

An orthogonal frequency division multiplexing (OFDM) system capable of reducing inter-symbol interference with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. To support these various schemes, control signals must be transmitted between a user equipment (UE) and a base station (BS). Examples of the control signals include a channel quality indicator (CQI) used when the UE reports a channel condition to the BS, an acknowledgement (ACK)/not-acknowledgement (NACK) signal that is a response for data transmission, a bandwidth request signal for requesting radio resource assignment, and precoding information, antenna information, or the like used in a multiple antenna system.

Diversification of system functions results in increase in the number of types of control signals to be transmitted. When more control signals have to be transmitted with limited radio resources, an amount of radio resources to be used for user data is decreased to that extent.

Accordingly, there is a need for a method capable of effectively transmitting various control signals by using limited radio resources in an efficient manner.

SUMMARY

The present invention provides a method of effectively transmitting a control signal.

According to an aspect of the present invention, a method of transmitting a control signal in a wireless communication system is provided. The method includes receiving data or a control signal, and transmitting a feedback signal through a control channel in response to the data or the control signal, wherein the control channel comprises a plurality of mini-tiles in a plurality of tiles, each of which consists of at least one orthogonal frequency division multiplexing (OFDM) symbol in a time domain and at least one subcarrier in a frequency domain, and if the plurality of tiles have the same pilot pattern, the plurality of mini-tiles are cyclically selected from the plurality of tiles, and if the plurality of tiles have cyclically-arranged pilot patterns, the plurality of mini-tiles are selected at the same position from the plurality of tiles.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink transmission and uses the SC-FDMA in uplink transmission. IEEE 802.16m is an evolution of IEEE 802.16e.

Figure 1:
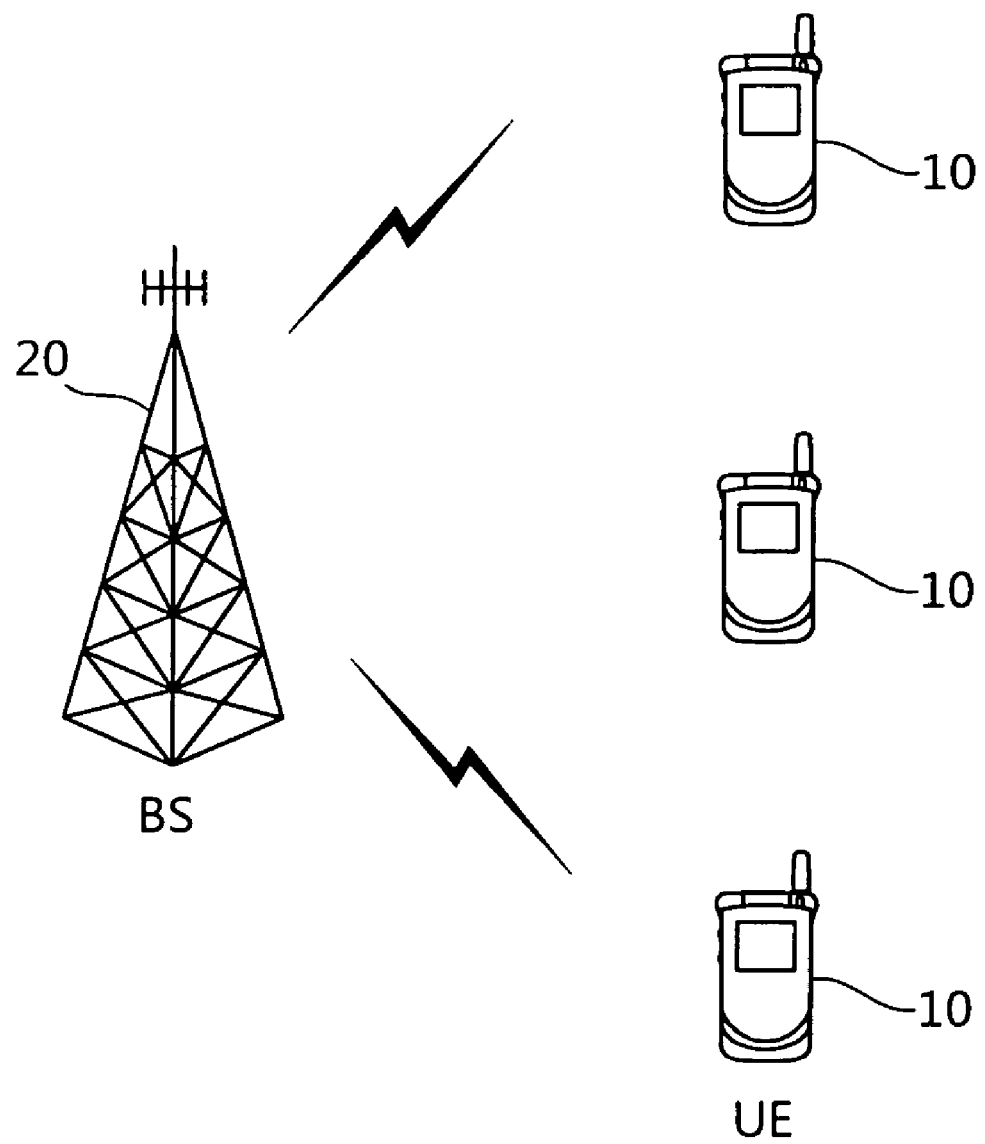
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, a downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
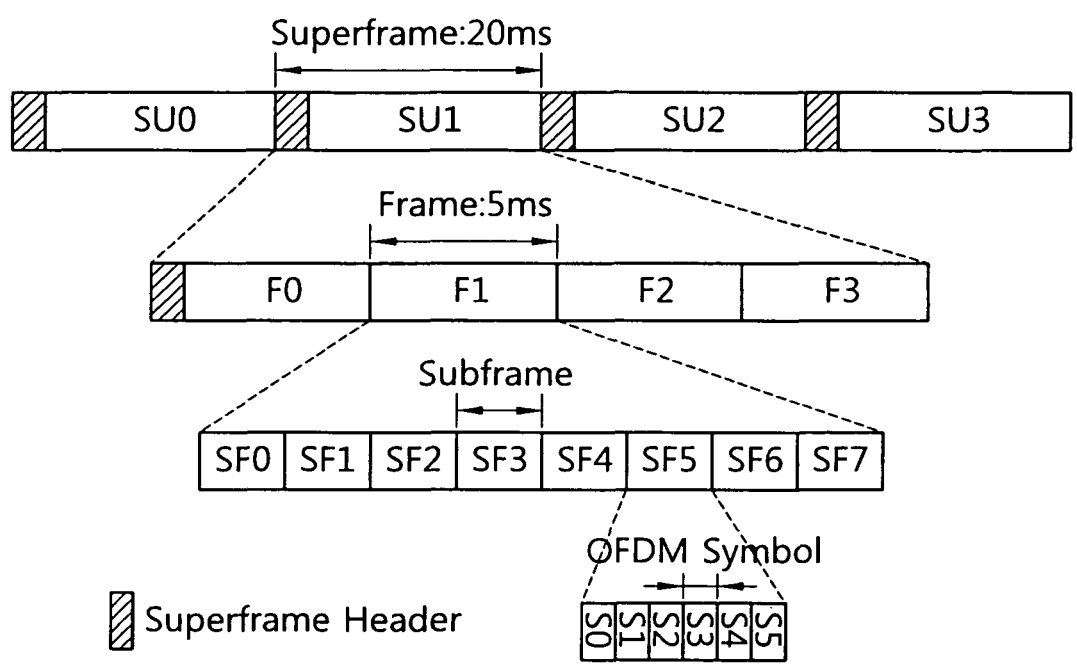
FIG. 2 shows an example of a frame structure.

FIG. 2 shows an example of a frame structure.

Referring to FIG. 2, a superframe includes a superframe header and four radio frames F0, F1, F2, and F3. Although it is shown that each superframe has a size of 20 milliseconds (ms) and each frame has a size of 5 ms, the present invention is not limited thereto. The superframe header may be located at a front-most position of the superframe. A common control channel is assigned to the superframe header. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 orthogonal frequency division multiplexing (OFDM) symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission can be simultaneously performed while occupying different frequency bands.

A fast feedback region may be included in the UL subframe. A fast feedback channel is a region allocated for UL transmission faster than general UL data transmission. The fast feedback channel can be used to transmit a channel quality indicator (CQI), an acknowledgment (ACK)/non-acknowledgment (NACK) signal, a bandwidth request signal, MIMO feedback information, etc. The fast feedback region can be located in any positions in the UL subframe (or frame).

A subframe includes at least one frequency partition. The frequency partition consists of at least one physical resource unit (PRU). The frequency partition may include a localized PRU and/or a distributed PRU. The frequency partition may be used for other purposes such as fractional frequency reuse (FFR) or multicast or broadcast service (MBS).

The PRU is defined as a basic physical unit for allocating resources including a plurality of consecutive OFDM symbols and a plurality of consecutive subcarriers. The number of OFDM symbols included in the PRU may be equal to the number of OFDM symbols included in one subframe. For example, when one subframe consists of six OFDM symbols, the PRU may be defined with 18 subcarriers and six OFDM symbols. A logical resource unit (LRU) is a basic logical unit for distributed resource allocation and localized resource allocation. The LRU is defined with a plurality of OFDM symbols and a plurality of subcarriers, and includes pilots used in the PRU. Therefore, one LRU includes a specific number of subcarriers, where the specific number depends on the number of allocated pilots.

A logical distributed resource unit (DRU) may be used to obtain a frequency diversity gain. The DRU includes a distributed subcarrier group in one frequency partition. The DRU has the same size as the PRU. One subcarrier is a basic unit of constituting the DRU.

A logical contiguous resource unit (CRU) may be used to obtain a frequency selective scheduling gain. The CRU includes a localized subcarrier group. The CRU has the same size as the PRU.

Hereinafter, a method of transmitting a control signal will be described. A UE may transmit the control signal by using a fast feedback region. Alternatively, the UE may transmit the control signal by using a dedicated control channel assigned to the UE. Examples of a type of the control signal include a CQI, an ACK/NACK signal, a bandwidth request signal, MIMO feedback information, etc.

Figure 3:
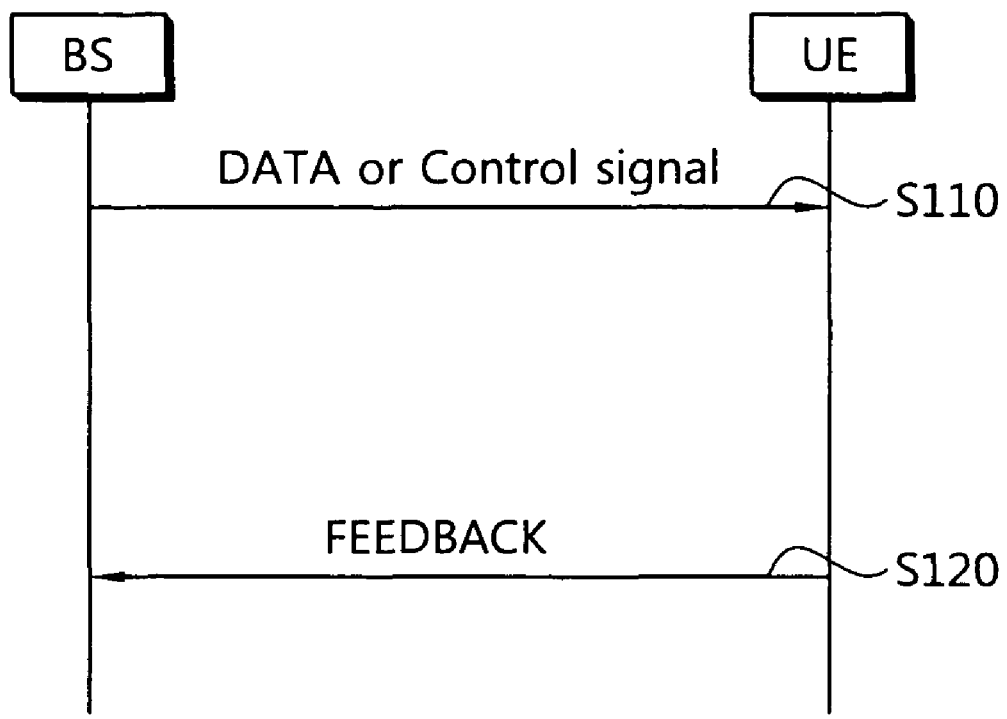
FIG. 3 shows a method of transmitting a control signal according to an embodiment of the present invention.

FIG. 3 shows a method of transmitting a control signal according to an embodiment of the present invention.

Referring to FIG. 3, a BS transmits data or a control signal to a UE (step S110). The data or control signal transmitted by the BS to the UE may be a signal for triggering the UE to transmit a feedback signal to the BS. The data or control signal transmitted by the BS to the UE may be transmitted through a DL data channel or DL control channel.

The UE transmits the feedback signal to the BS in response to the received data or control signal (step S120). The feedbacks signal is a response signal for a received signal. The feedback signal includes a control signal required for communication between the BS and the UE. The feedback signal may be determined according to a type of the data or control signal transmitted by the BS. The feedback signal may be transmitted through a UL control channel or a UL data channel. Alternatively, the feedback signal may be transmitted through a fast feedback channel.

A method of transmitting the feedback signal and a type of the feedback signal transmitted by the UE according to the type of the data or control signal transmitted by the BS can be performed as described below.

(1) When the data or control signal transmitted by the BS is a channel state report request message for instructing the UE to perform channel measurement and channel state report, the UE generates a CQI by measuring a channel state. The UE reports the CQI generated as a feedback signal. The CQI may be an average CQI for a whole frequency or a CQI for a best band having a higher CQI level. Meanwhile, the CQI may be transmitted with a specific period, and in this case, the process of requesting channel state report may be skipped and the UE may report the CQI according to a predetermined transmission period.

(2) When the data or control signal transmitted by the BS in the multiple antenna system is a channel state report request, the UE generates and reports MIMO feedback information together with the CQI. The MIMO feedback information includes information required for data transmission using multiple antennas. The MIMO feedback information may include a precoding matrix indicator (PMI), a rank indicator (RI), a correlation matrix, stream information, etc. The PMI may be a PMI for a whole frequency or a PMI for a best band having a high CQI level. A rank may be determined according to the number of antennas used by the BS or the UE, a channel state, etc. The MIMO feedback information may be transmitted with a specific period, and in this case, the process of requesting channel state report may be skipped and the UE may report the MIMO feedback information according to a predetermined transmission period.

(3) When the data or control signal transmitted by the BS is user data to which a hybrid automatic repeat request (HARQ) scheme is applied, the UE attempts to perform an error correction process on the received data and uses an error detection code to determine whether an error occurs. Cyclic redundancy check (CRC) may be used as the error detection code. If an error is detected from the user data by performing the CRC detection process, the UE transmits an NACK signal as a feedback signal. If the error is not detected from the user data, the UE transmits an ACK signal as a feedback signal. Transmission of the ACK signal may be skipped. Upon receiving the NACK signal, the BS transmits suitable retransmission data according to an HARQ mode.

Figure 4:
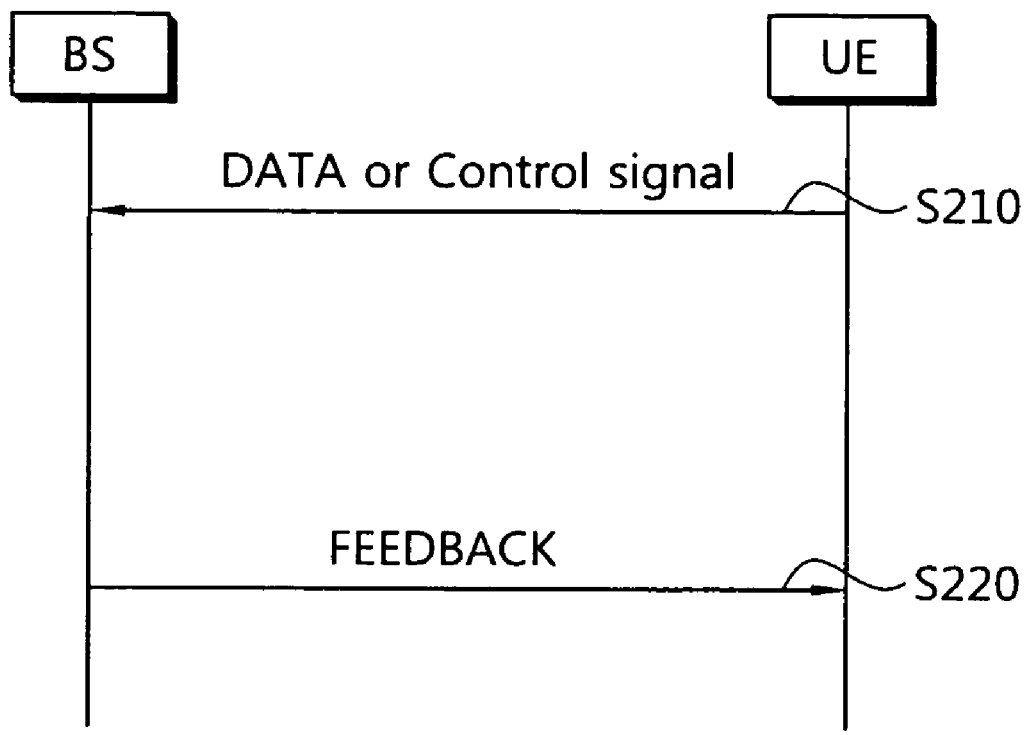
FIG. 4 shows a method of transmitting a control signal according to another embodiment of the present invention.

FIG. 4 shows a method of transmitting a control signal according to another embodiment of the present invention.

Referring to FIG. 4, a UE transmits data or a control signal to a BS (step S210). The data or control signal transmitted by the UE to the BS may be a signal for triggering the BS to transmit a feedback signal to the UE. The data or control signal transmitted by the UE to the BS may be transmitted through a UL data channel or UL control channel.

The BS transmits a feedback signal to the UE in response to the received data or control signal (step S220). The feedback signal may be determined according to a type of the data or control signal transmitted by the UE. The feedback signal may be transmitted through a DL control channel or a DL data channel.

A method of transmitting the feedback signal and a type of the feedback signal transmitted by the BS according to the type of the data or control signal transmitted by the UE can be performed as described below.

(1) When the data or control signal transmitted by the UE is data to which an HARQ scheme is applied, the BS attempts to perform an error correction process on the received data and transmits an ACK signal or an NACK signal as a feedback signal according to whether an error occurs. The ACK/NACK signal may be transmitted through a DL control channel.

(2) When the control signal transmitted by the UE is a bandwidth request signal, the BS transmits a UL radio resource assignment message to the UE as a feedback signal. The bandwidth request signal is a signal for requesting assignment of a radio resource used for UL transmission of the UE. The bandwidth request signal includes a bandwidth request indicator consisting of an orthogonal sequence or a bandwidth request message including information required for radio resource assignment. The bandwidth request indicator may be transmitted together with the bandwidth request message or may be transmitted independently from the bandwidth request message. The bandwidth request signal may be transmitted through a UL control channel or a fast feedback channel. The UL radio resource assignment message may represent radio resource assignment information for a bandwidth request message or radio resource assignment information for UL data of the UE. The uplink radio resource assignment message may be transmitted through a DL control channel.

Hereinafter, a control channel for transmitting a control signal or a feedback signal will be described. The control channel is not limitedly used to transmit the aforementioned control signal or feedback signal, and can be used to transmit various types of control signals for communication between a BS and a UE. The control channel described below can be applied to a UL control channel, a DL control channel, and a fast feedback channel.

The control channel includes at least one tile. The tile consists of at least one frequency-domain subcarrier on at least one time-domain OFDM symbol. The tile is a group of a plurality of contiguous subcarriers in the time domain and the frequency domain. The tile includes a plurality of data subcarriers and/or pilot subcarriers. A sequence of the control signal may be mapped to the data subcarrier. A pilot for channel estimation may be mapped to the pilot subcarrier. The tile may consist of a plurality of mini-tiles. The mini-tile may consist of at least one frequency-domain subcarrier on at least one time-domain OFDM symbol.

The control channel is designed by considering the following facts.

(1) A plurality of tiles included in the control channel can be distributed over the time domain or the frequency domain to obtain a diversity gain. For example, when it is considered that a DRU includes three tiles, each of which consists of six consecutive subcarriers on six OFDM symbols, the control channel may include three tiles, each of which can be distributed over the frequency domain or the time domain. Alternatively, the control channel may include at least one tile, and the tile may consist of a plurality of mini-tiles, each of which can be distributed over the frequency domain or the time domain. For example, the mini-tile may be configured with a structure of (OFDM symbol×subcarrier)=6×6, 3×6, 2×6, 1×6, 6×3, 6×2, 6×1, etc. If it is assumed that a control channel including a tile with a PUSC structure of (OFDM symbol×subcarrier)=3×4 is multiplexed with a control channel including the mini-tile by using a frequency division multiplexing (FDM) scheme, the mini-tile may be configured with a structure of (OFDM symbol×subcarrier)=6×2, 6×1, etc. When only the control channel including the mini-tile is considered, the mini-tile may be configured with a structure of (OFDM symbol×subcarrier)=6×2, 3×6, 2×6, 1×6, etc.

(2) The number of OFDM symbols constituting the control channel has to be a minimum number in order to support a high-speed UE. For example, to support a UE moving with a speed of 350 km/h, the number of OFDM symbols constituting the control channel is preferably 3 or below.

(3) Tx power per symbol of the UE is limited, and in order to increase the Tx power per symbol of the UE, it is preferable to have a large number of OFDM symbols constituting the control channel. Therefore, the number of OFDM symbols has to be properly determined by considering the high-speed UE described in (2) and the Tx power per symbol of the UE described in (3).

(4) For coherent detection, a pilot subcarrier for channel estimation has to be evenly distributed over the time domain or the frequency domain. The coherent detection is a method of obtaining data carried on the data subcarrier after performing channel estimation using a plot. For power boosting of the pilot subcarrier, an identical number of pilots are allocated to each OFDM symbol of the control channel so that Tx power per symbol can be maintained to be constant.

(5) For non-coherent detection, the control signal has to be constructed of an orthogonal code/sequence or a semi-orthogonal code/sequence or has to be subject to spreading.

Figure 5:
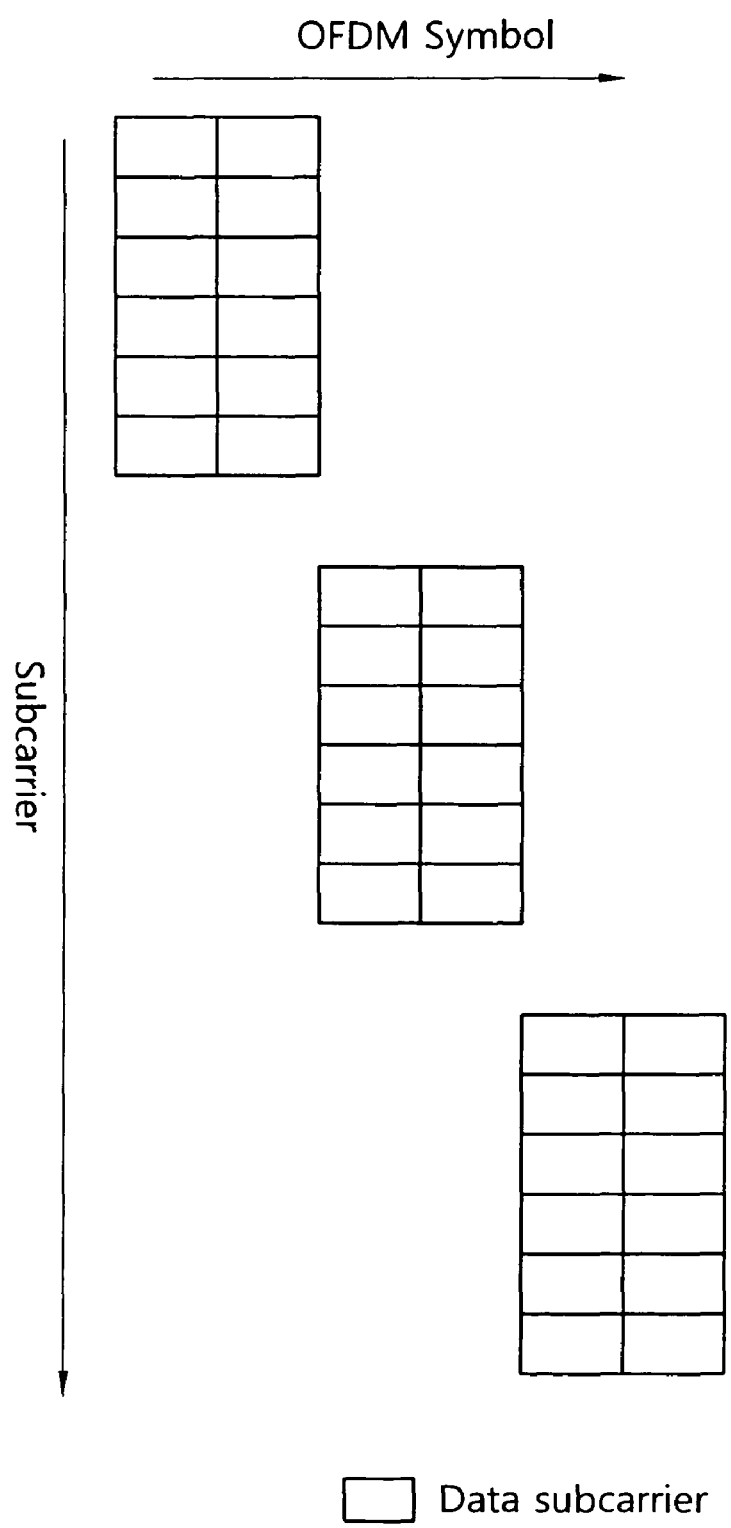
FIG. 5 shows a control channel according to an embodiment of the present invention.

FIG. 5 shows a control channel according to an embodiment of the present invention.

Referring to FIG. 5, the control channel includes one or more tiles. The tile included in the control channel may include a plurality of mini-tiles. Herein, three mini-tiles, each of which consists of two OFDM symbols and six consecutive subcarriers, are distributed in a time domain and a frequency domain. The mini-tiles may be distributed over only the frequency domain or the time domain. The three mini-tiles may constitute one control channel, or may constitute any one of a plurality of tiles constituting the control channel. Each mini-tile includes 12 data subcarriers. In the data subcarrier, an orthogonal sequence of the control signal may be mapped or a symbol of the control signal may be spread with an orthogonal sequence. The control signal may be detected using a non-coherent scheme.

Figure 6:
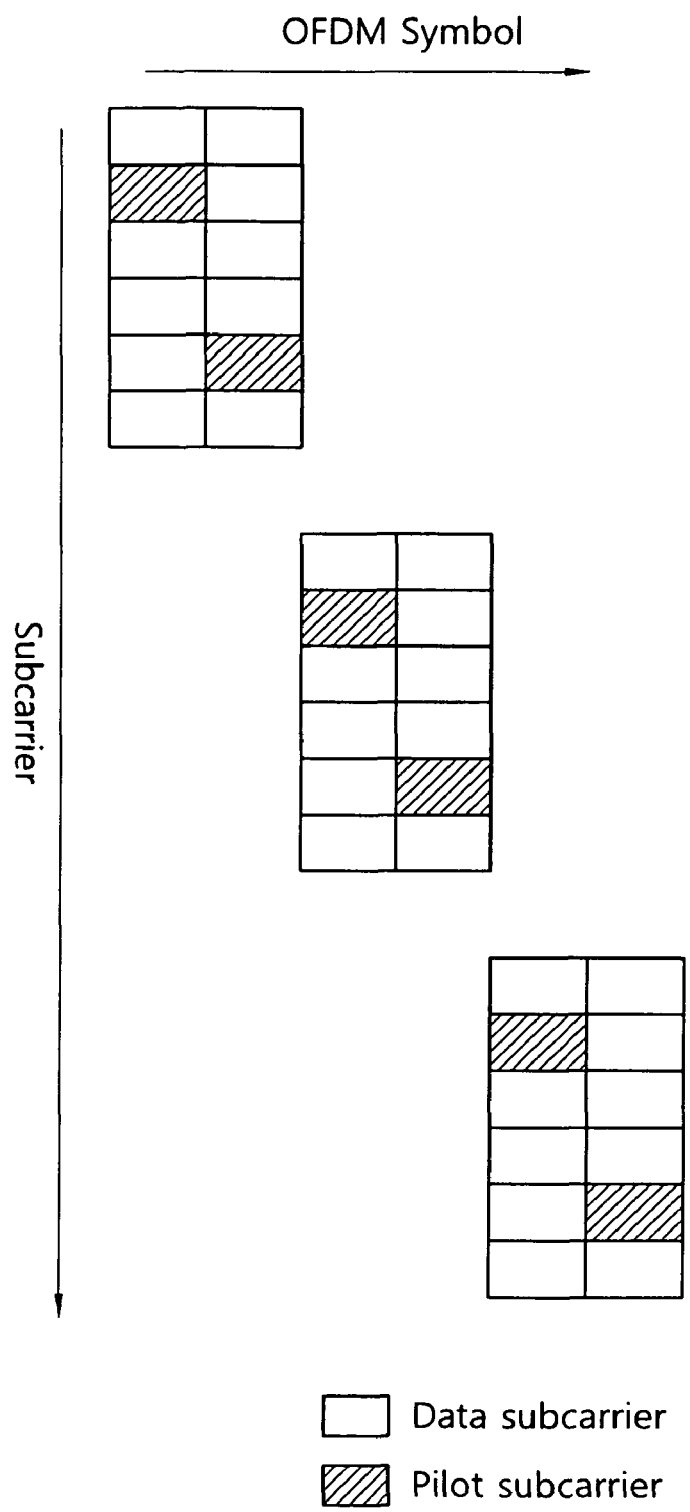
FIG. 6 shows a control channel according to another embodiment of the present invention.
Figure 7:
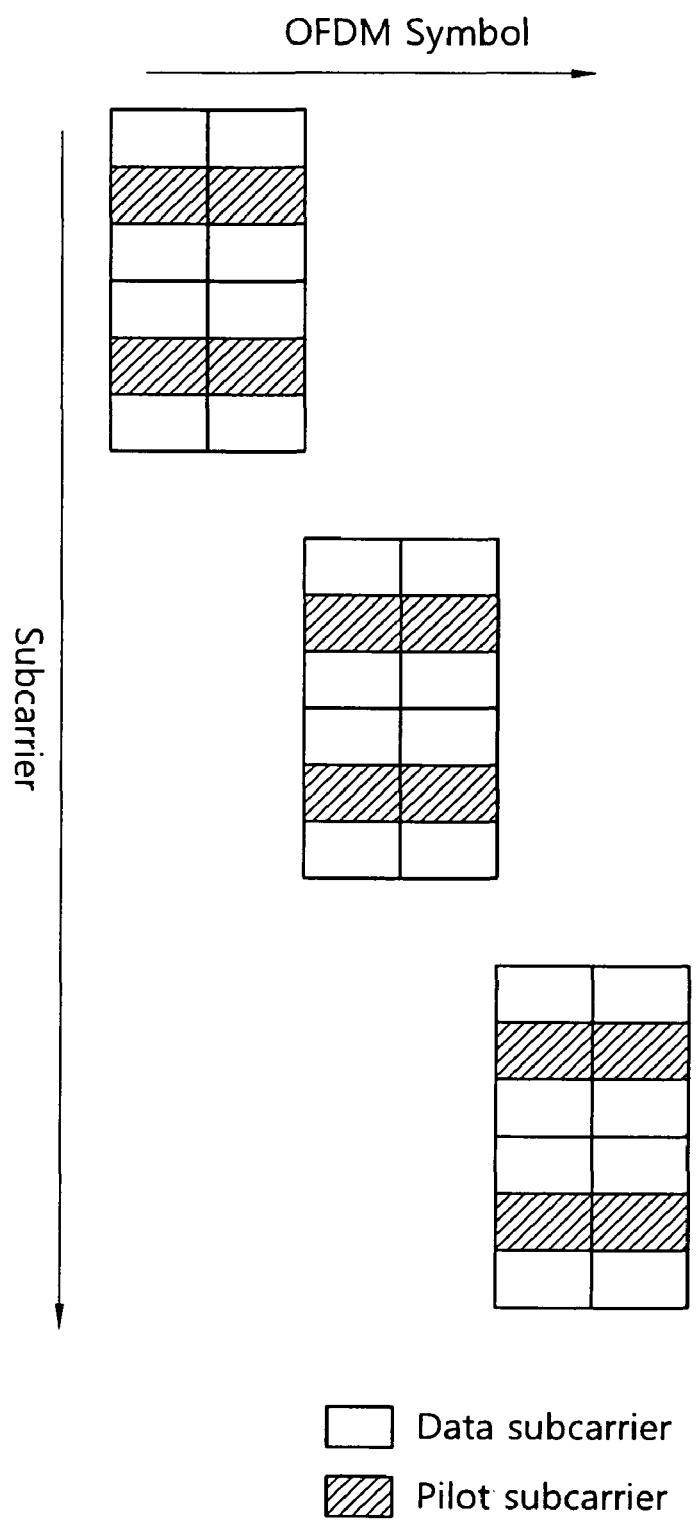
FIG. 7 shows a control channel according to another embodiment of the present invention.
Figure 8:
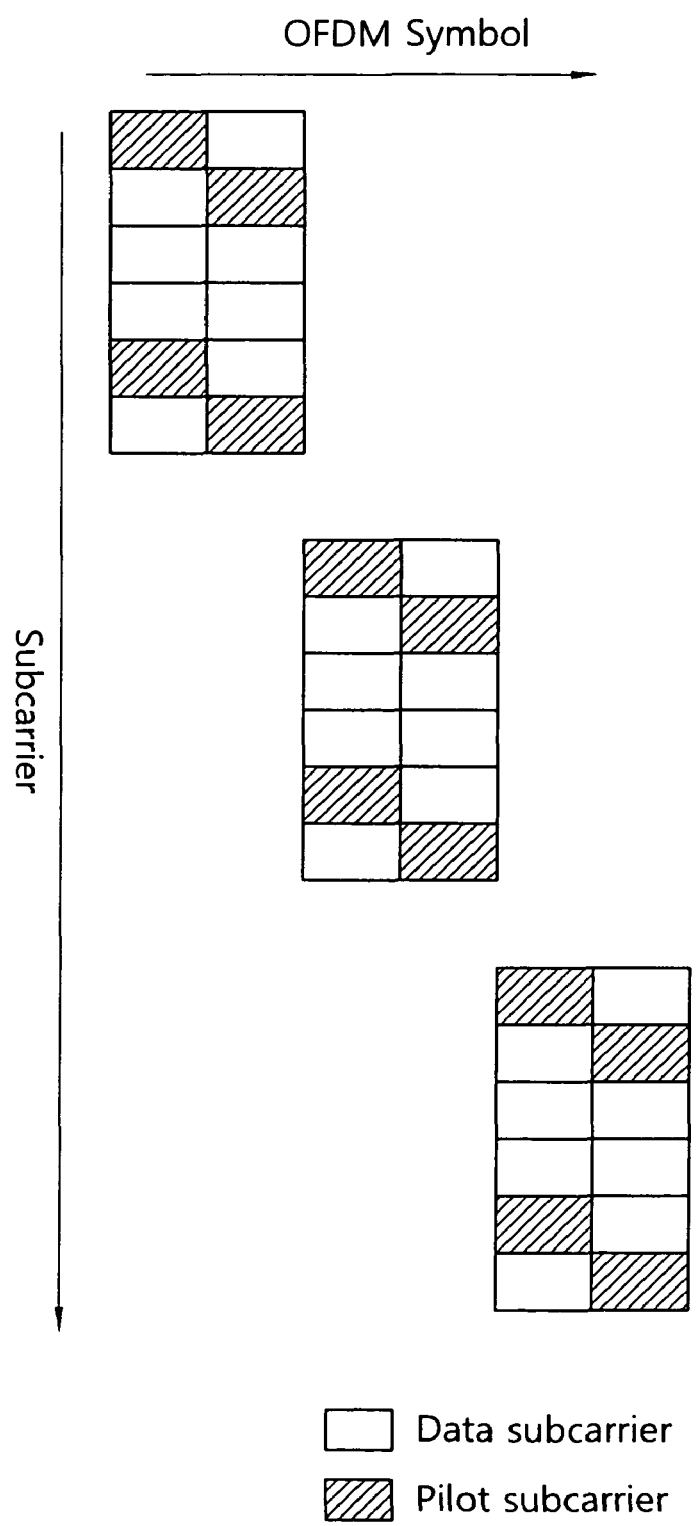
FIG. 8 shows a control channel according to another embodiment of the present invention.
Figure 9:
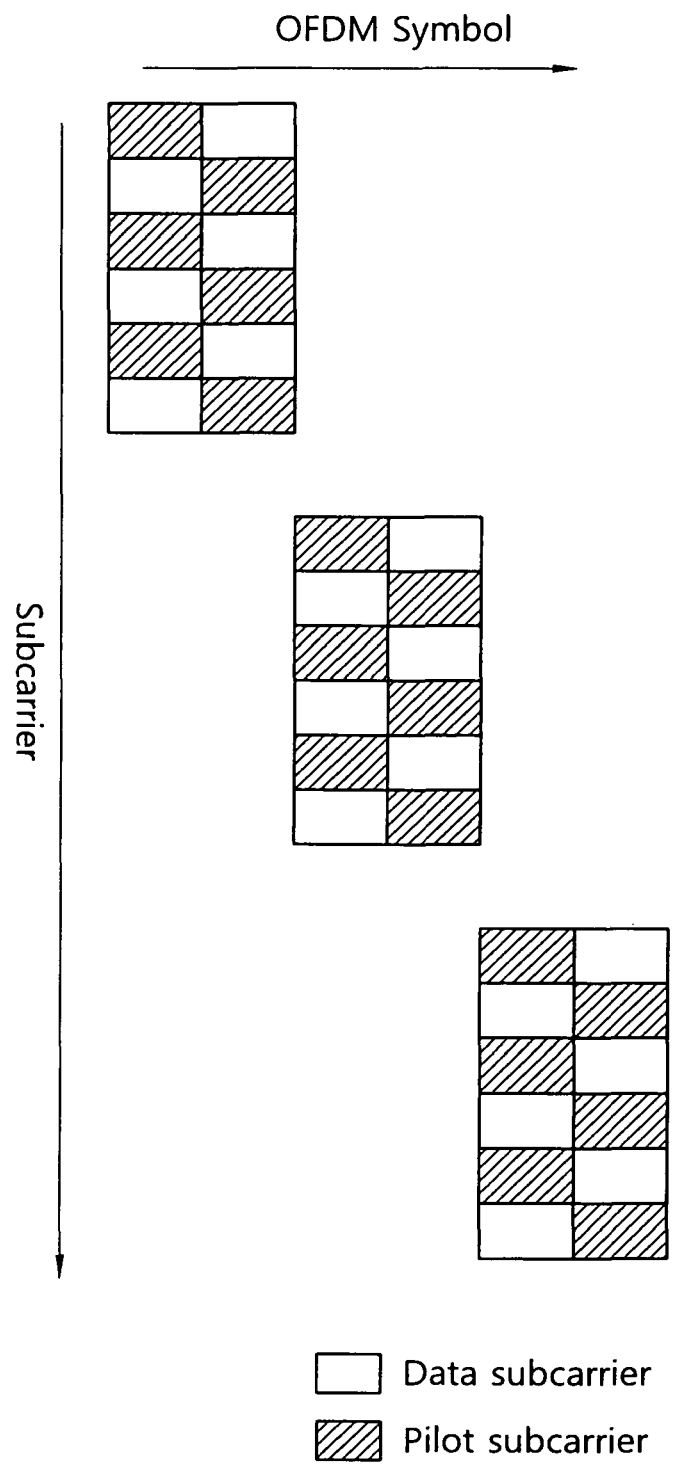
FIG. 9 shows a control channel according to another embodiment of the present invention.

FIG. 6 shows a control channel according to another embodiment of the present invention. FIG. 7 shows a control channel according to another embodiment of the present invention. FIG. 8 shows a control channel according to another embodiment of the present invention. FIG. 9 shows a control channel according to another embodiment of the present invention.

Referring to FIG. 6 to FIG. 9, a mini-tile constituting the control channel consists of a data subcarrier and a pilot subcarrier in comparison with FIG. 5. An identical number of pilot subcarriers are allocated to two OFDM symbols of the mini-tile. One pilot subcarrier may be allocated to each of two OFDM symbols as shown in FIG. 6. Two pilot subcarriers may be allocated to each of two OFDM symbols as shown in FIG. 7 and FIG. 8. Three pilot subcarriers may be allocated to each of two OFDM symbols as shown in FIG. 9. For accurate channel estimation of the control channel, it is preferable to have a large number of pilot subcarriers included in a mini-tile. However, the number of data subcarriers included in the mini-tile is decreased by the number of pilot subcarriers. The number of pilot subcarriers included in the mini-tile can be properly determined according to a type of the control signal or system performance.

Positions of the pilot subcarriers are not limited in the frequency domain. The pilot subcarriers of each OFDM symbol may be allocated to the same position or different positions in the frequency domain. For coherent detection, the pilot subcarriers are evenly distributed over the frequency domain.

Figure 10:
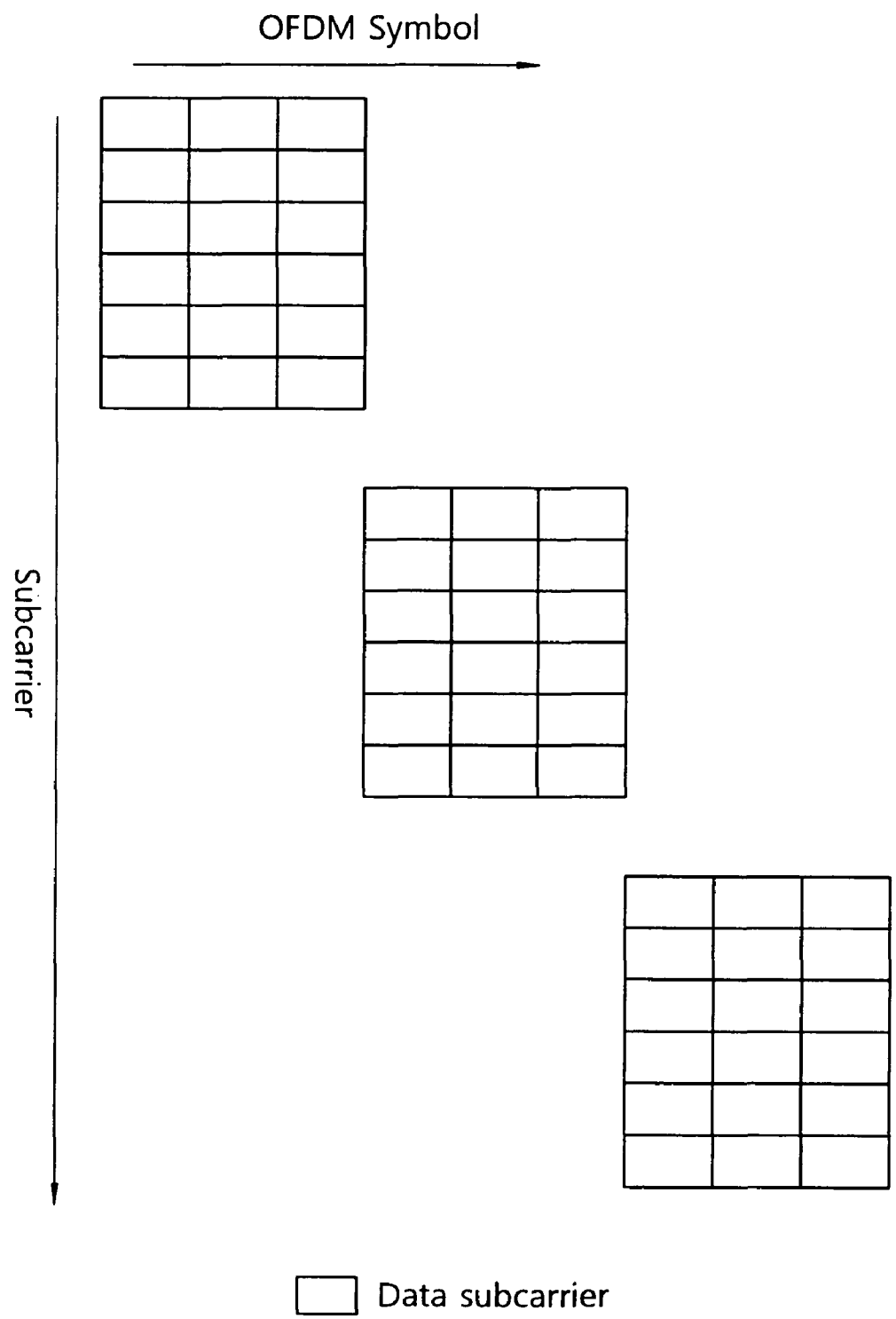
FIG. 10 shows a control channel according to another embodiment of the present invention.

FIG. 10 shows a control channel according to another embodiment of the present invention.

Referring to FIG. 10, a mini-tile included in the control channel may consist of three OFDM symbols and six consecutive subcarriers. Three mini-tiles may constitute one tile (or control channel). The three mini-tiles can be distributed over a time domain and a frequency domain. Each mini-tile includes 18 data subcarriers. In the data subcarrier, an orthogonal sequence of the control signal may be mapped or a symbol of the control signal may be spread with an orthogonal sequence. The control signal may be detected using a non-coherent scheme.

Figure 11:
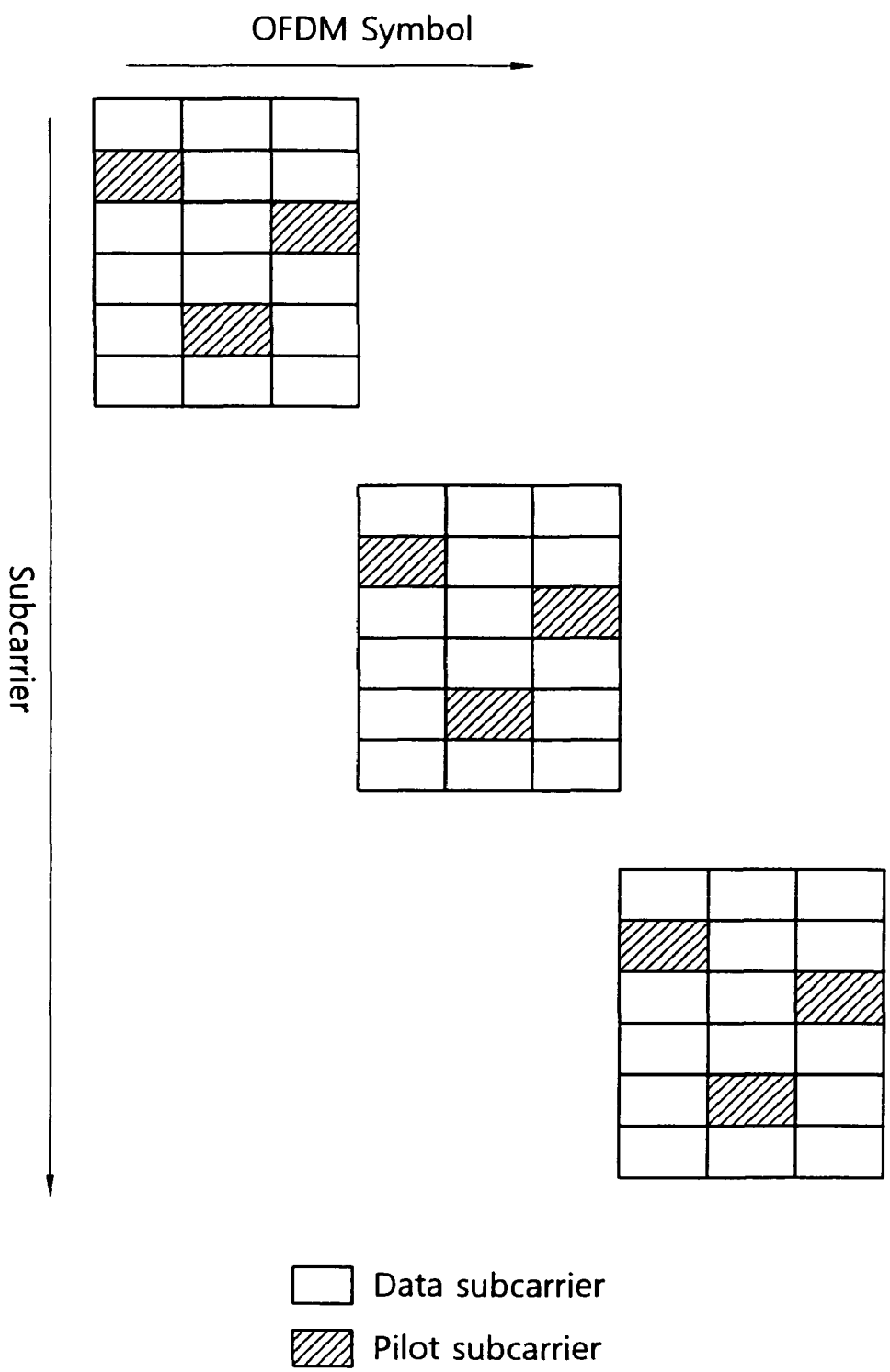
FIG. 11 shows a control channel according to another embodiment of the present invention.
Figure 12:
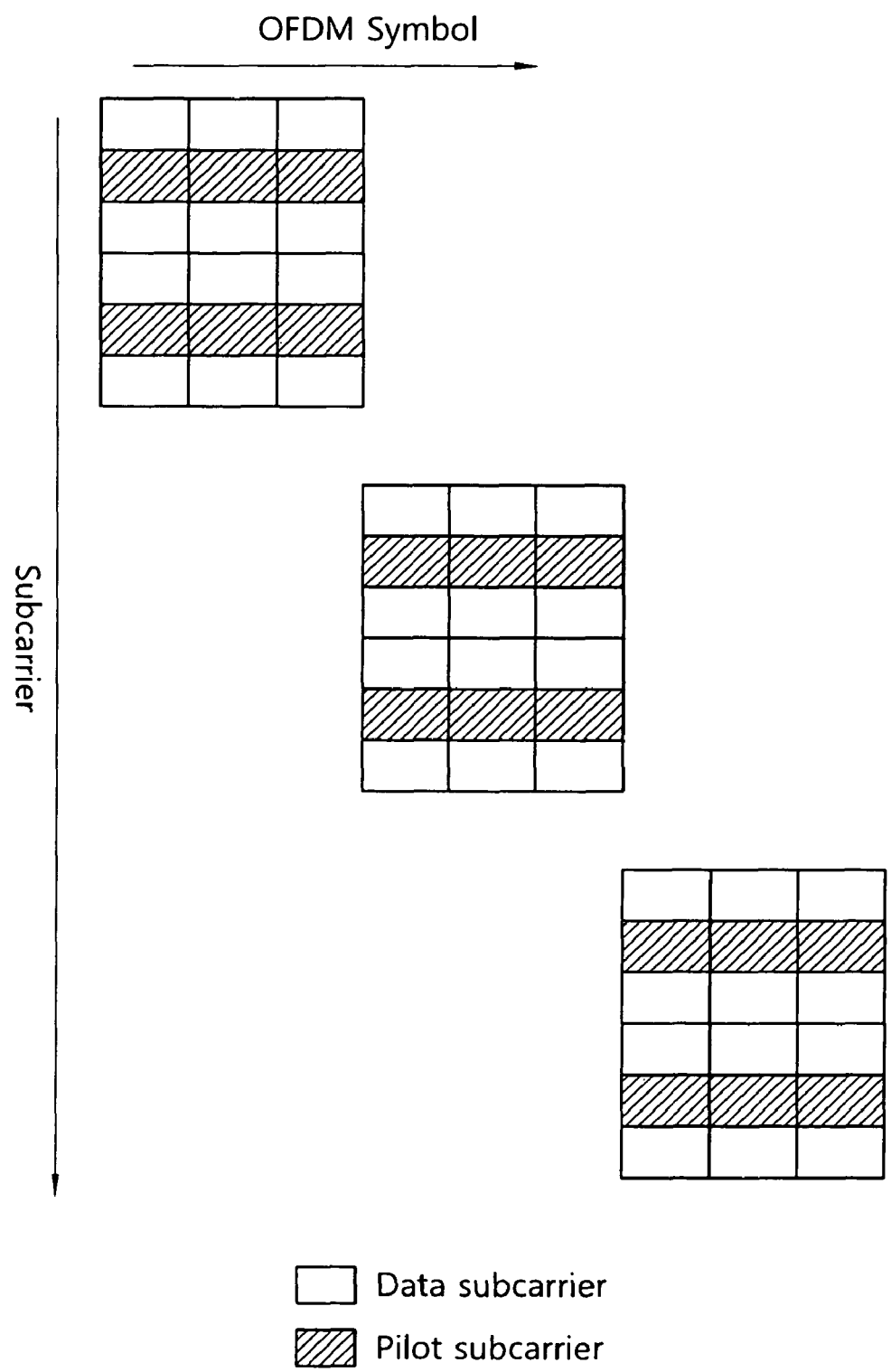
FIG. 12 shows a control channel according to another embodiment of the present invention.
Figure 13:
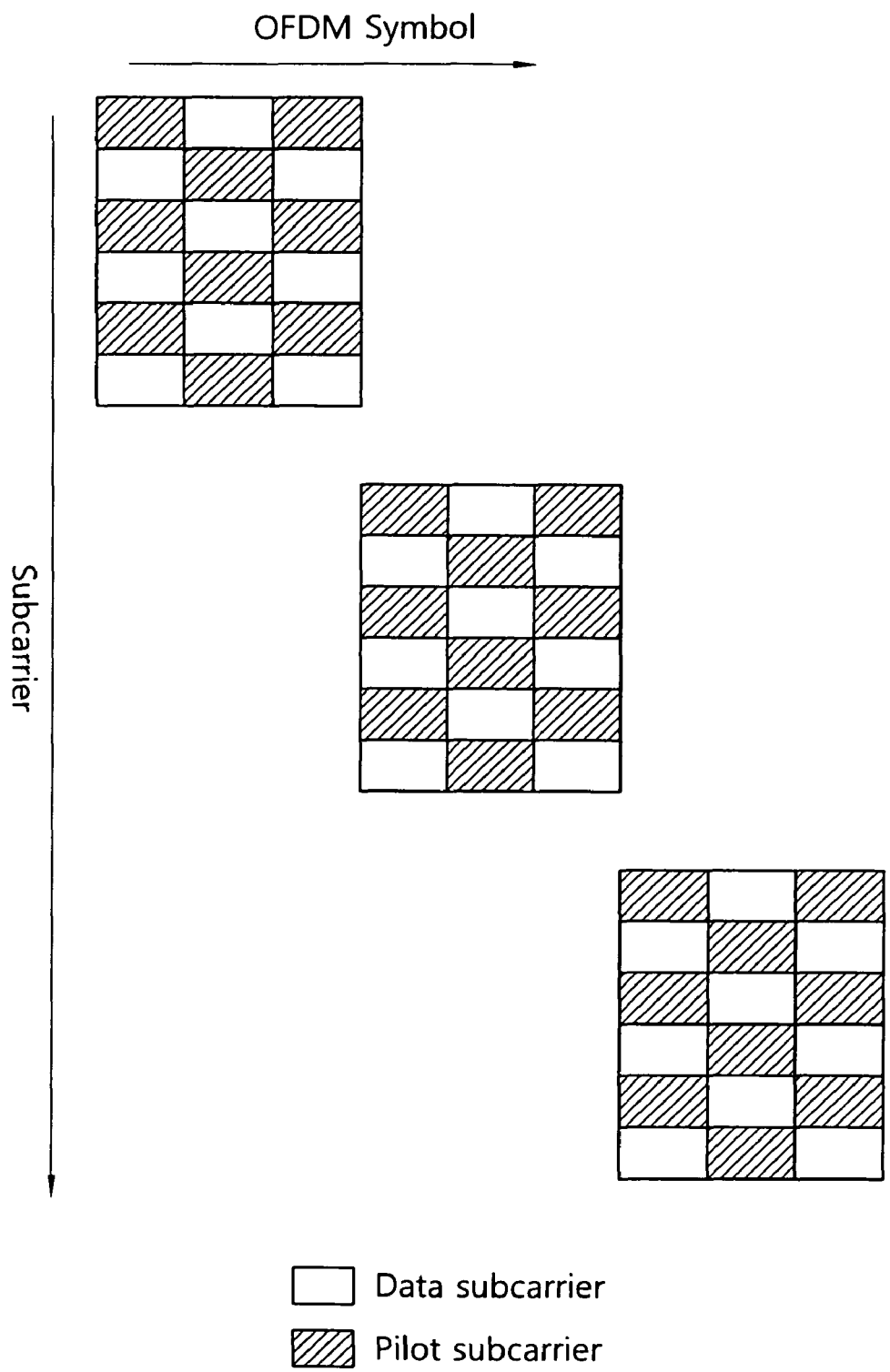
FIG. 13 shows a control channel according to another embodiment of the present invention.

FIG. 11 shows a control channel according to another embodiment of the present invention. FIG. 12 shows a control channel according to another embodiment of the present invention. FIG. 13 shows a control channel according to another embodiment of the present invention.

Referring to FIG. 11 to FIG. 13, a mini-tile constituting the control channel consists of a data subcarrier and a pilot subcarrier in comparison with FIG. 10. An identical number of pilot subcarriers are allocated to three OFDM symbols of the mini-tile. One pilot subcarrier may be allocated to each of three OFDM symbols as shown in FIG. 11. Two pilot subcarriers may be allocated to each of three OFDM symbols as shown in FIG. 12. Three pilot subcarriers may be allocated to each of three OFDM symbols as shown in FIG. 13. There is no restriction on the number of pilot subcarriers allocated to OFDM symbols of each mini-tile.

Positions of the pilot subcarriers are not limited in the frequency domain. The pilot subcarriers of each OFDM symbol may be allocated to the same position or different positions in the frequency domain. For coherent detection, the pilot subcarriers are evenly distributed over the frequency domain.

Figure 14:
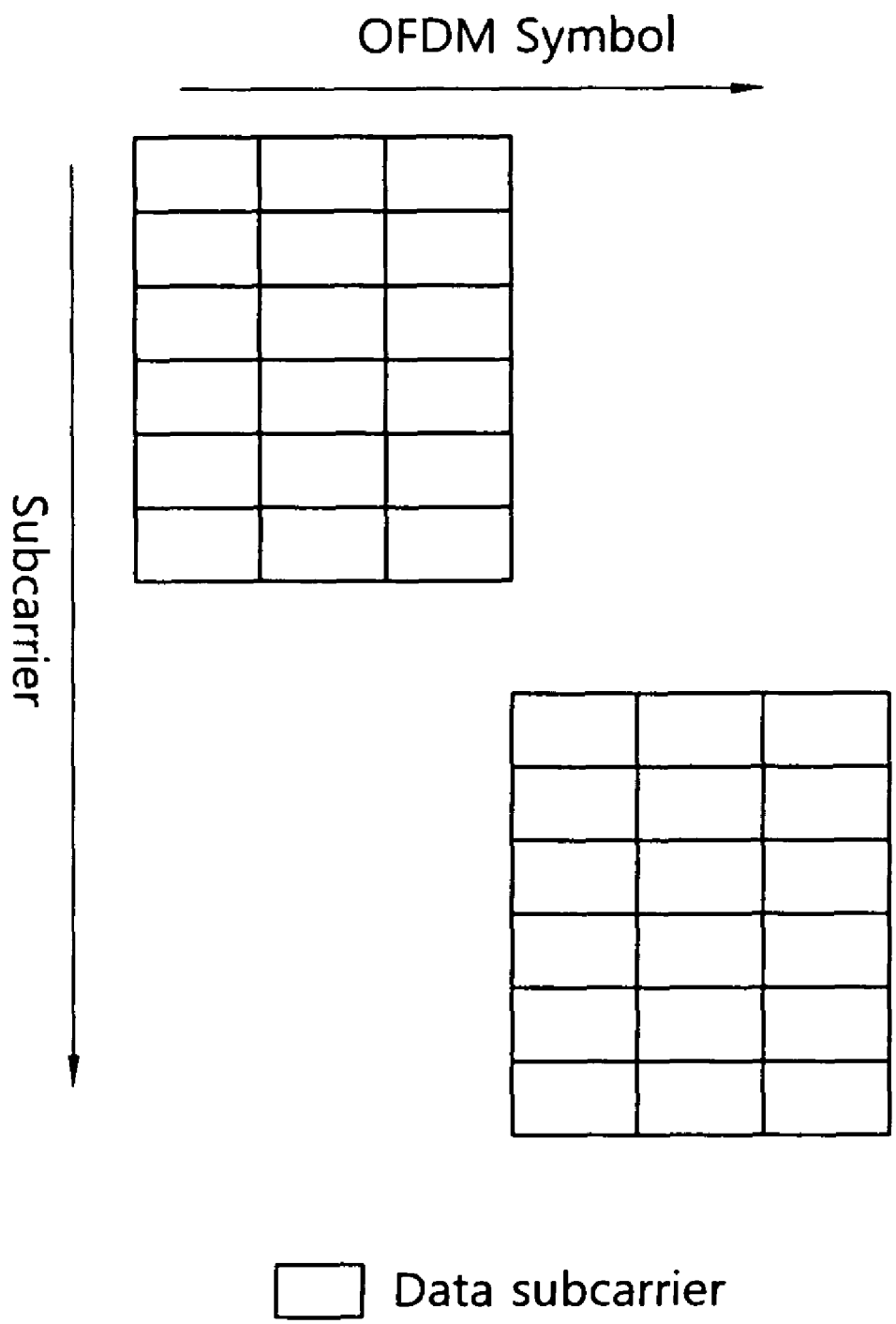
FIG. 14 shows a control channel according to another embodiment of the present invention.

FIG. 14 shows a control channel according to another embodiment of the present invention.

Referring to FIG. 14, a mini-tile included in the control channel may consist of three OFDM symbols and six consecutive subcarriers. When considering a mini-tile included in a tile consisting of six OFDM symbols and six subcarriers, one tile (or control channel) may include two mini-tiles, each of which consists of three OFDM symbols and six consecutive subcarriers. Two mini-tiles may constitute one tile (or control channel). The two mini-tiles can be distributed over a time domain and a frequency domain.

Figure 15:
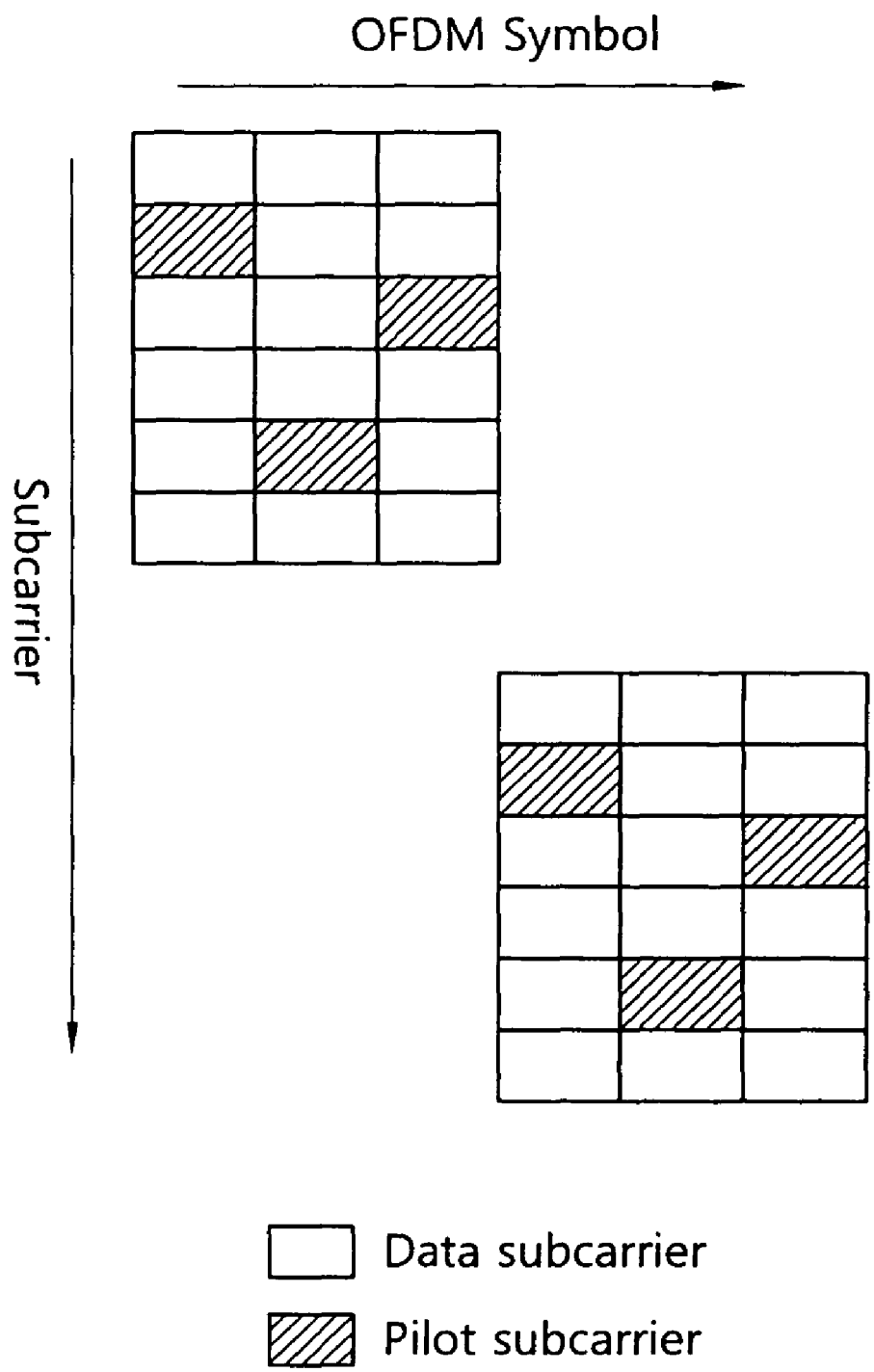
FIG. 15 shows a control channel according to another embodiment of the present invention.
Figure 16:
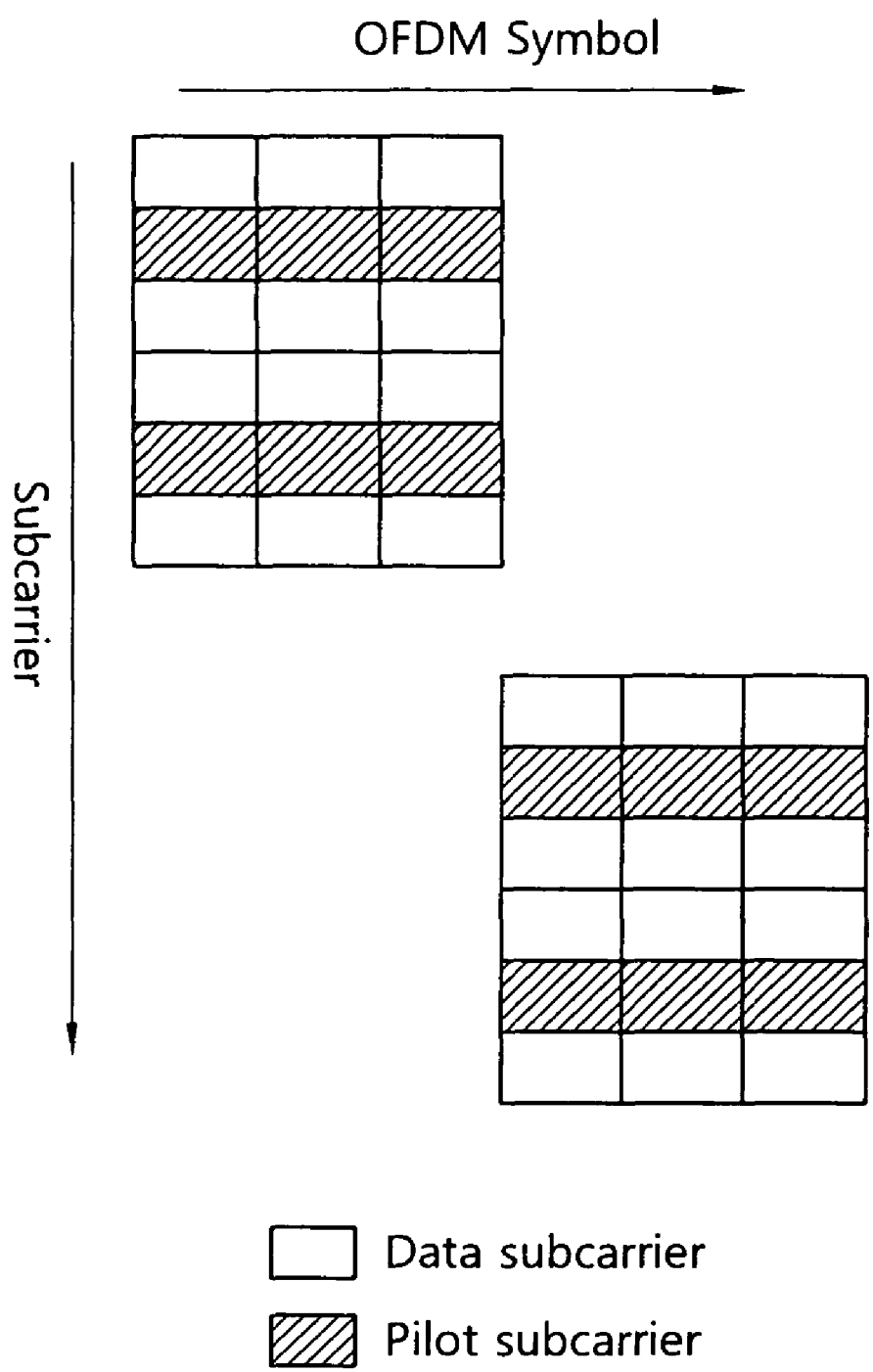
FIG. 16 shows a control channel according to another embodiment of the present invention.
Figure 17:
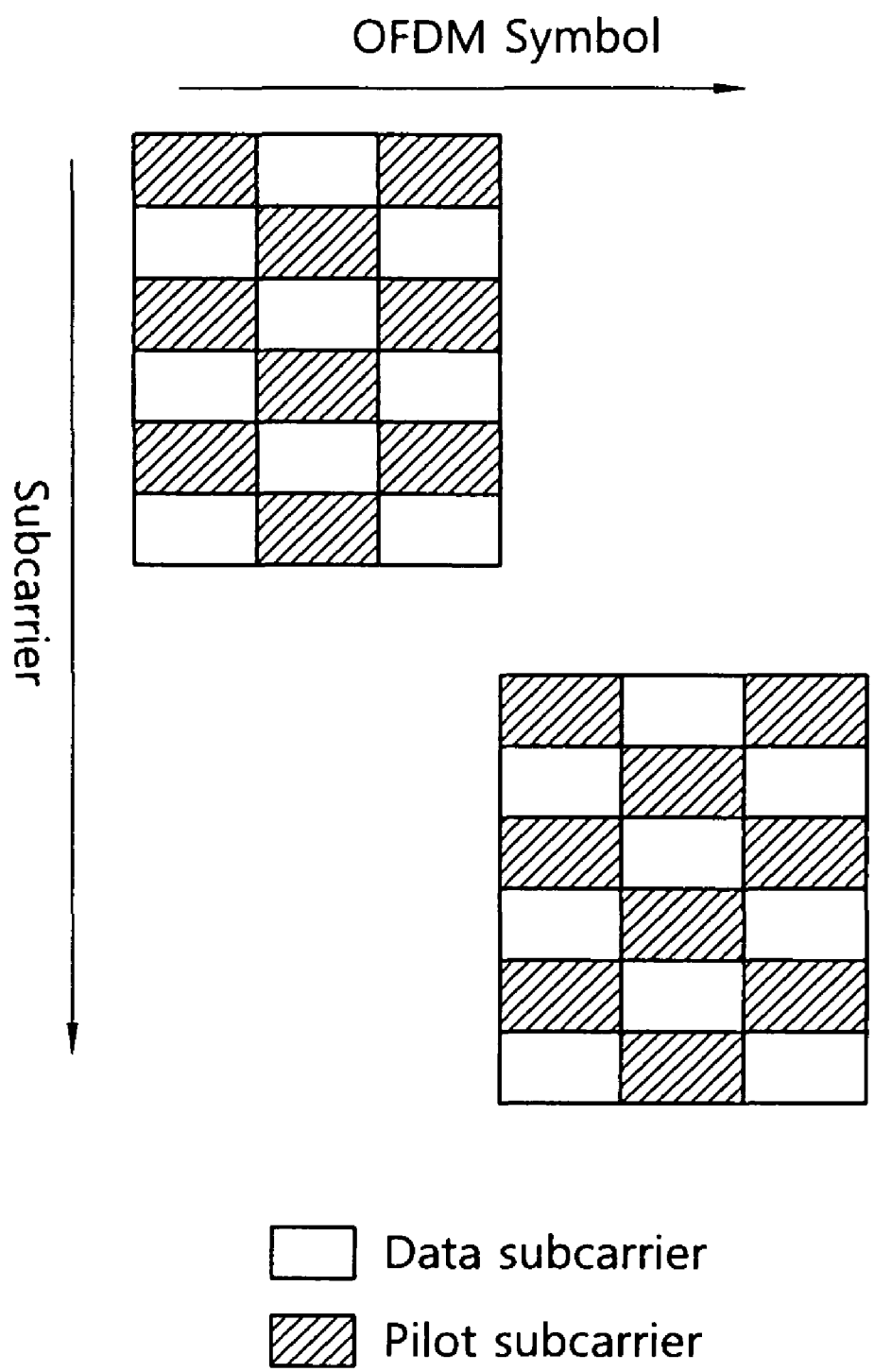
FIG. 17 shows a control channel according to another embodiment of the present invention.

FIG. 15 shows a control channel according to another embodiment of the present invention. FIG. 16 shows a control channel according to another embodiment of the present invention. FIG. 17 shows a control channel according to another embodiment of the present invention.

Referring to FIG. 15 to FIG. 17, a mini-tile constituting the control channel consists of a data subcarrier and a pilot subcarrier in comparison with FIG. 14. An identical number of pilot subcarriers are allocated to three OFDM symbols of the mini-tiles. One pilot subcarrier may be allocated to each of three OFDM symbols as shown in FIG. 15. Two pilot subcarriers may be allocated to each of three OFDM symbols as shown in FIG. 16. Three pilot subcarriers may be allocated to each of three OFDM symbols as shown in FIG. 17. There is no restriction on the number of pilot subcarriers allocated to OFDM symbols of each mini-tile.

Positions of the pilot subcarriers are not limited in the frequency domain. The pilot subcarriers of each OFDM symbol may be allocated to the same position or different positions in the frequency domain.

Figure 18:
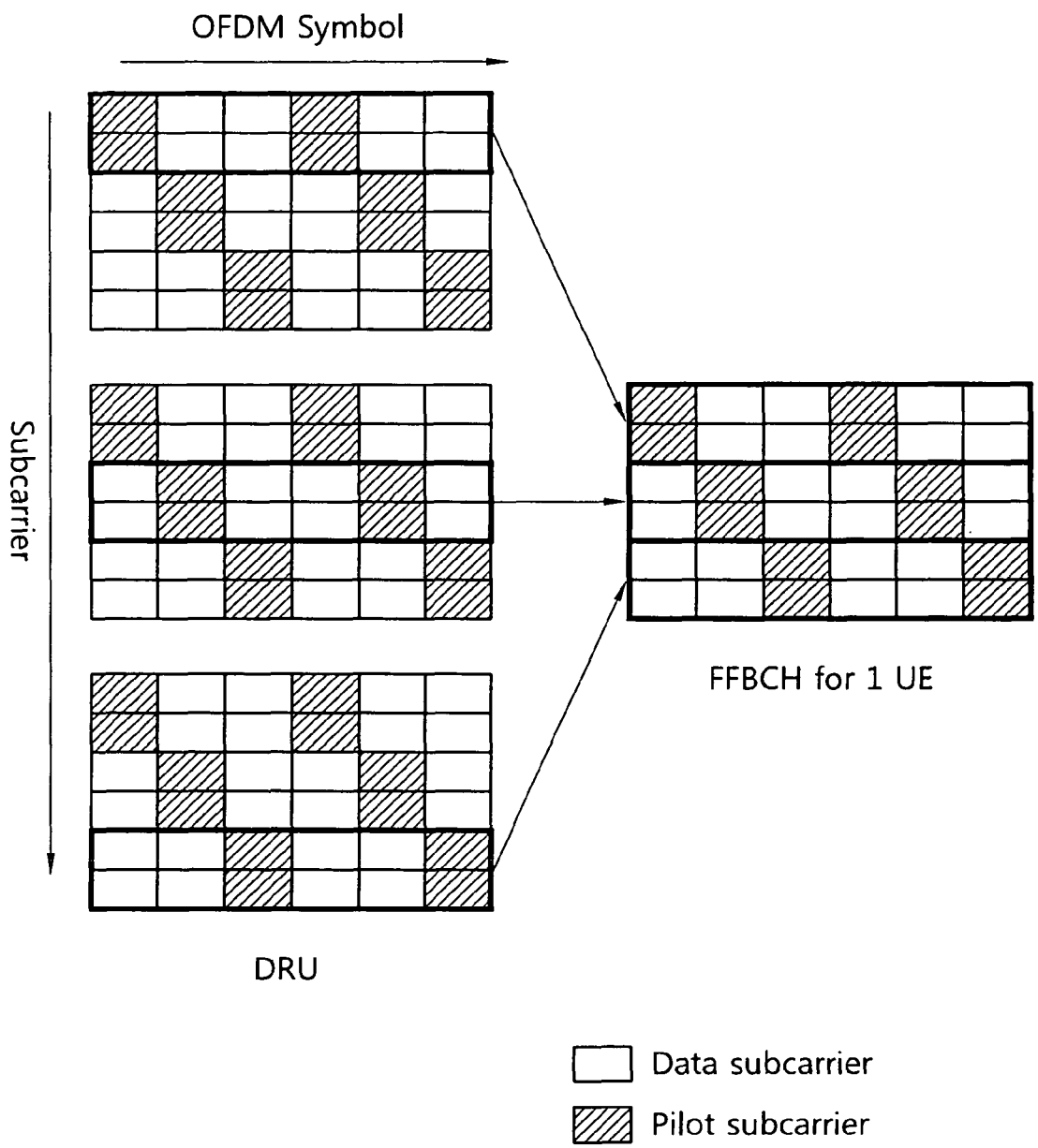
FIG. 18 shows a fast feedback channel (FFBCH) according to an embodiment of the present invention.

FIG. 18 shows a fast feedback channel (FFBCH) according to an embodiment of the present invention. The FFBCH can be utilized as a control channel for transmitting various control signals.

Referring to FIG. 18, the FFBCH may be used to transmit a CQI, MIMO feedback information, a bandwidth allocation signal, and so on. The FFBCH includes a primary FFBCH and a secondary FFBCH. The primary FFBCH may be used to transmit a CQI, MIMO feedback information, and so on for a wideband. The secondary FFBCH may be used to transmit a CQI, MIMO feedback information, and so on for a narrow band. That is, a CQI, a PMI, and so on for a full frequency band may be transmitted through the primary FFBCH, and a CQI, a PMI, and so on for a best band may be transmitted through the secondary FFBCH. The secondary FFBCH can support a larger control information bits by using a high code rate.

The FFBCH can be allocated to a predetermined position defined by a broadcast message. The FFBCH may be periodically allocated to a UE. Feedback information of a plurality of UEs may be transmitted through the FFBCH by using time division multiplexing (TDM), frequency division multiplexing (FDM), or code division multiplexing (CDM). The FFBCH through which an ACK/NACK signal is transmitted in response to data to which an HARQ scheme is applied can start at a predefined offset.

The FFBCH includes at least one mini-tile. The mini-tile constituting the FFBCH may consist of two consecutive subcarriers on six OFDM symbols. Alternatively, the mini-tile constituting the FFBCH may consist of six consecutive subcarriers on two OFDM symbols. The mini-tile constituting the FFBCH may be distributed over a frequency domain or a time domain. A plurality of mini-tiles may be included in one LRU. Multiple FFBCHs may be allocated to one LRU.

It is assumed that the FFBCH includes three mini-tiles, each of which consists of two consecutive subcarriers on six OFDM symbols. A mini-tile constituting an FFBCH for one UE is selected from a DRU including three tiles, each of which consists of six OFDM symbols and six subcarriers. In this case, the mini-tile is cyclically selected such that an identical number of pilots are allocated to each OFDM symbol of the FFBCH for one UE. Pilot subcarriers for all tiles of the DRU have the same structure, but positions of pilot subcarriers of each mini-tile selected as the FFBCH for one UE are different from one another. Therefore, an identical number of pilots are allocated to each OFDM symbol of the FFBCH.

Equation 1 shows a method of determining a mini-tile constituting an FFBCH in three tiles i, j, and k allocated for an $n^{th}$ FFBCH allocated to one UE.

$$i=(n \bmod 3)$$

$$j=(n+1 \bmod 3)$$

$$k=(n+2 \bmod 3) \qquad \text{[Equation 1]}$$

If a lager number of tiles are allocated to the FFBCH, three tiles are selected from the large number of tiles, and a mini-tile constituting the FFBCH can be determined from the three selected tiles according to the method of Equation 1. The three tiles may be selected from the large number of tiles allocated to the FFBCH according to a predetermined permutation rule.

Figure 19:
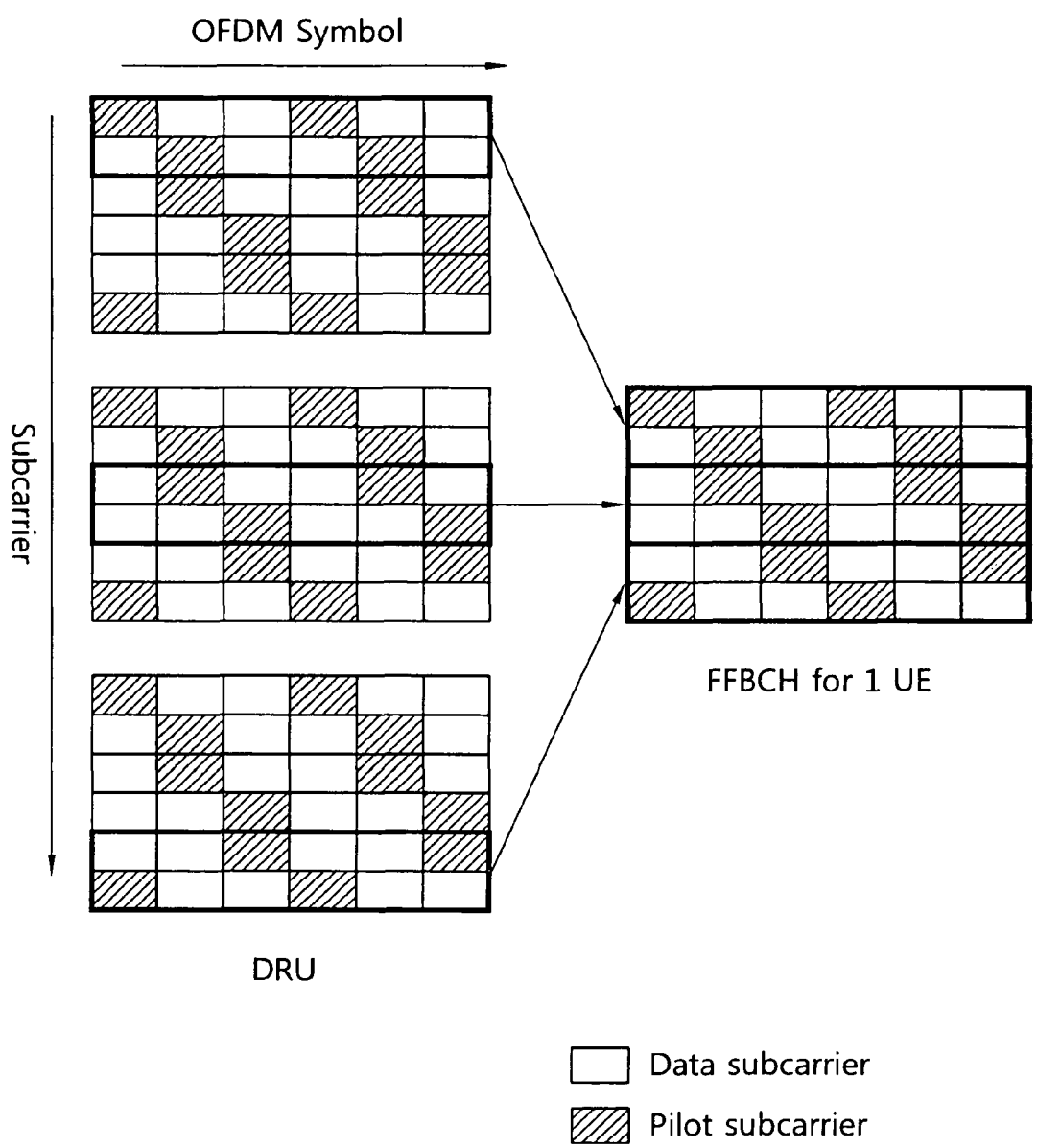
FIG. 19 shows an FFBCH according to another embodiment of the present invention.
Figure 20:
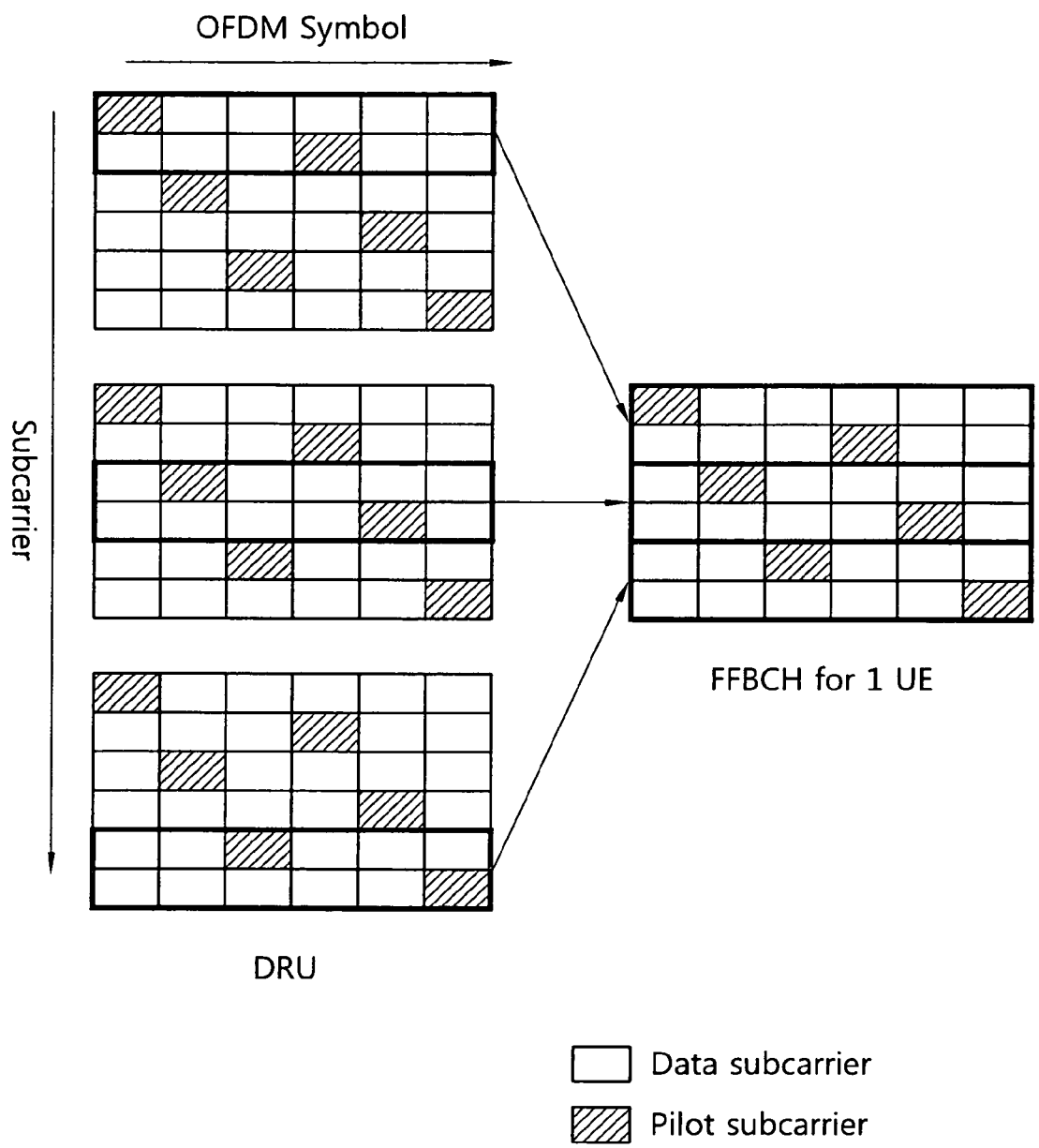
FIG. 20 shows an FFBCH according to another embodiment of the present invention.

FIG. 19 shows an FFBCH according to another embodiment of the present invention. FIG. 20 shows an FFBCH according to another embodiment of the present invention.

Referring to FIG. 19 and FIG. 20, a position of a pilot subcarrier is changed in comparison with FIG. 18. Although the position of the pilot subcarrier is changed, if pilot subcarriers of all tiles of a DRU have the same structure, a mini-tile can be cyclically selected by using Equation 1 such that an identical number of pilots are allocated to each OFDM symbol of an FFBCH for one UE.

Figure 21:
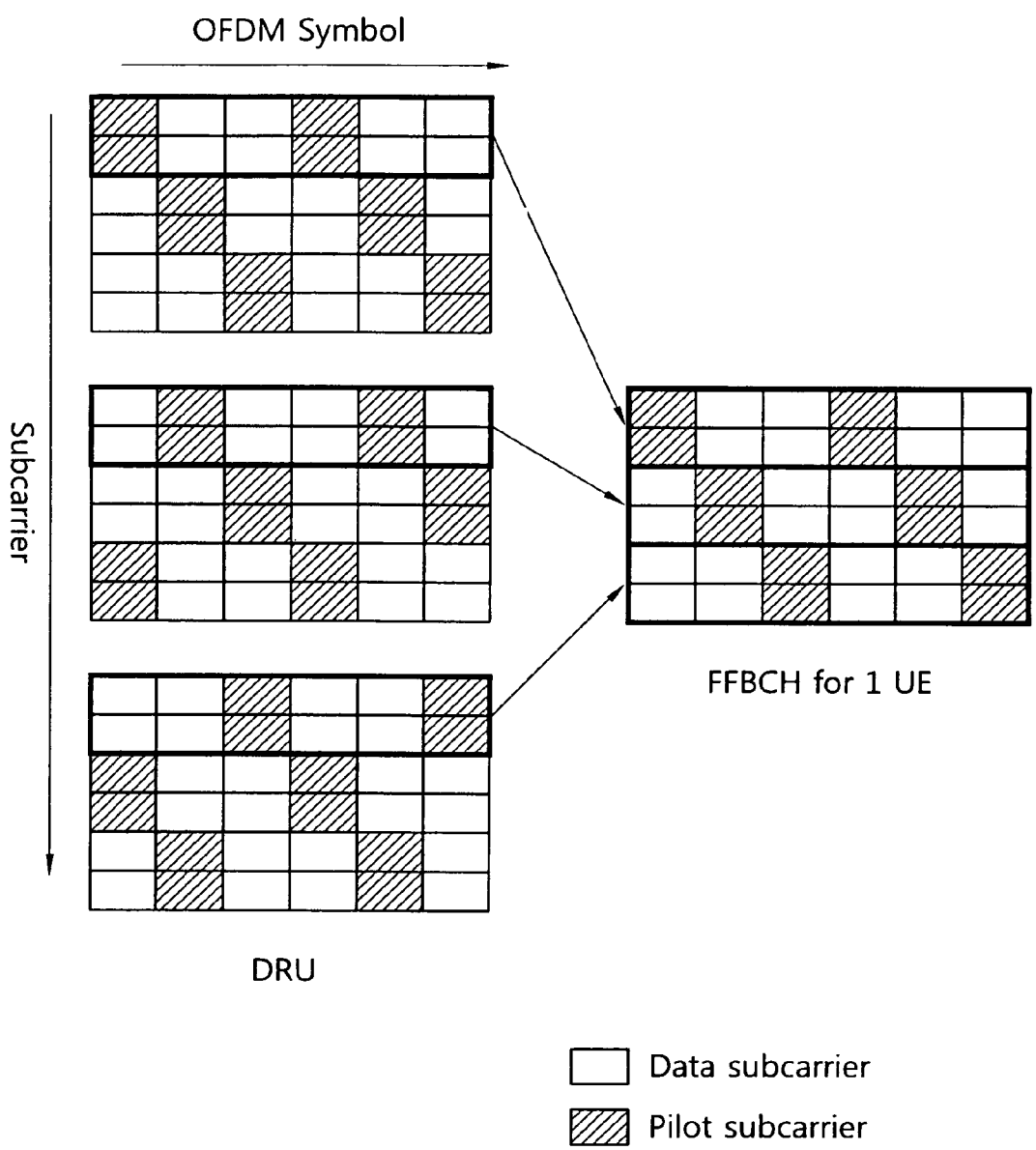
FIG. 21 shows an FFBCH according to another embodiment of the present invention.

FIG. 21 shows an FFBCH according to another embodiment of the present invention.

Referring to FIG. 21, the FFBCH includes three mini-tiles, each of which consists of two consecutive subcarriers on six OFDM symbols. The three mini-tiles constituting the FFBCH for one UE are selected from a DRU including three mini-tiles, each of which consists of six OFDM symbols and six subcarriers.

A position of a mini-tile selected as the FFBCH for one UE is constant for each tile. Pilot subcarriers of each tile included in the DRU may have different structures such that an identical number of pilots are allocated to each OFDM symbol of the FFBCH for one UE. This is a case where an order of a mini-tile is cyclically changed from the tile of DRU of FIG. 18, and thus an identical number of pilots are allocated to each OFDM symbol of the FFBCH for one UE even if the selected mini-tiles has the same position in each tile of the DRU. When a pilot included in a plurality of tiles is cyclically arranged, the selected mini-tile may be located in the same position in each tile.

Equation 2 shows a method of determining a mini-tile constituting an FFBCH in three tiles i, j, and k allocated for an $n^{th}$ FFBCH allocated to one UE when the selected mini-tile is located in the same position in each tile of the DRU.

$i = (n \bmod 3)$ $j = (n \bmod 3)$ $k = (n \bmod 3)$ [Equation 2]

As such, when a plurality of mini-tiles are selected from the DRU to constitute the FFBCH for one UE, the number of pilots are maintained to be identical for each OFDM symbol, and thus a control signal can be effectively transmitted through the FFBCH.

Figure 22:
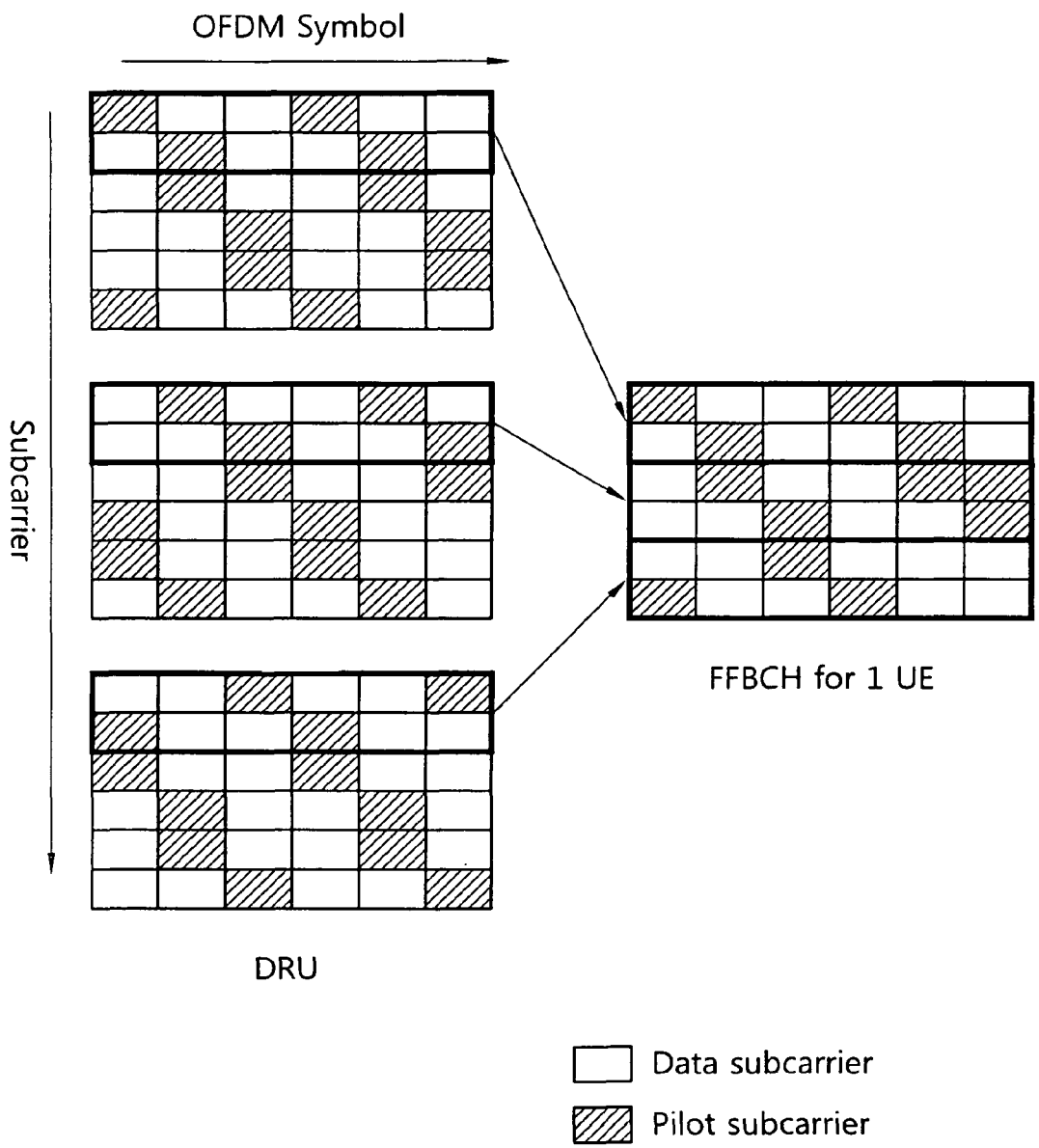
FIG. 22 shows an FFBCH according to another embodiment of the present invention.
Figure 23:
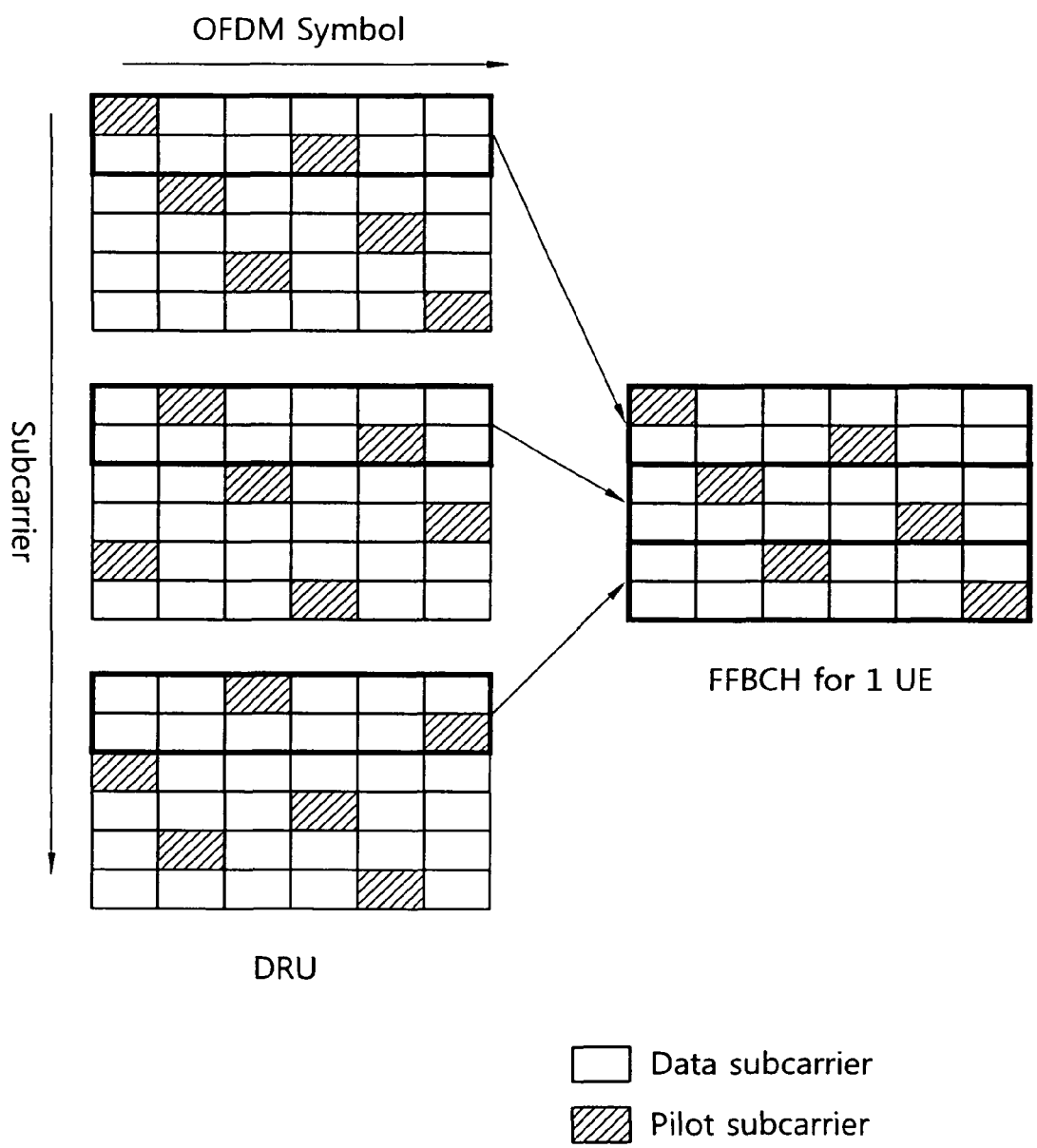
FIG. 23 shows an FFBCH according to another embodiment of the present invention.
Figure 24:
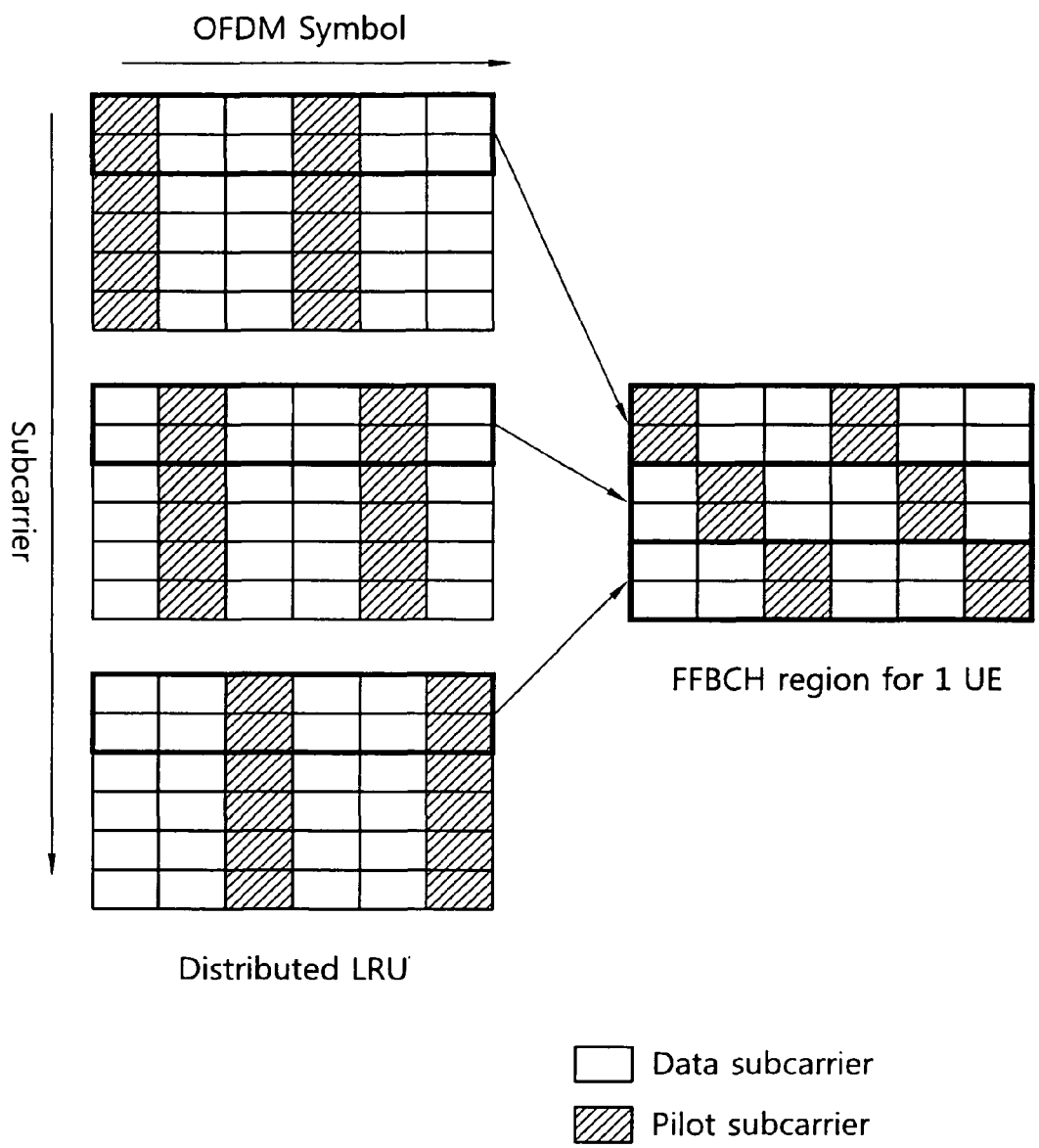
FIG. 24 shows an FFBCH according to another embodiment of the present invention.
Figure 25:
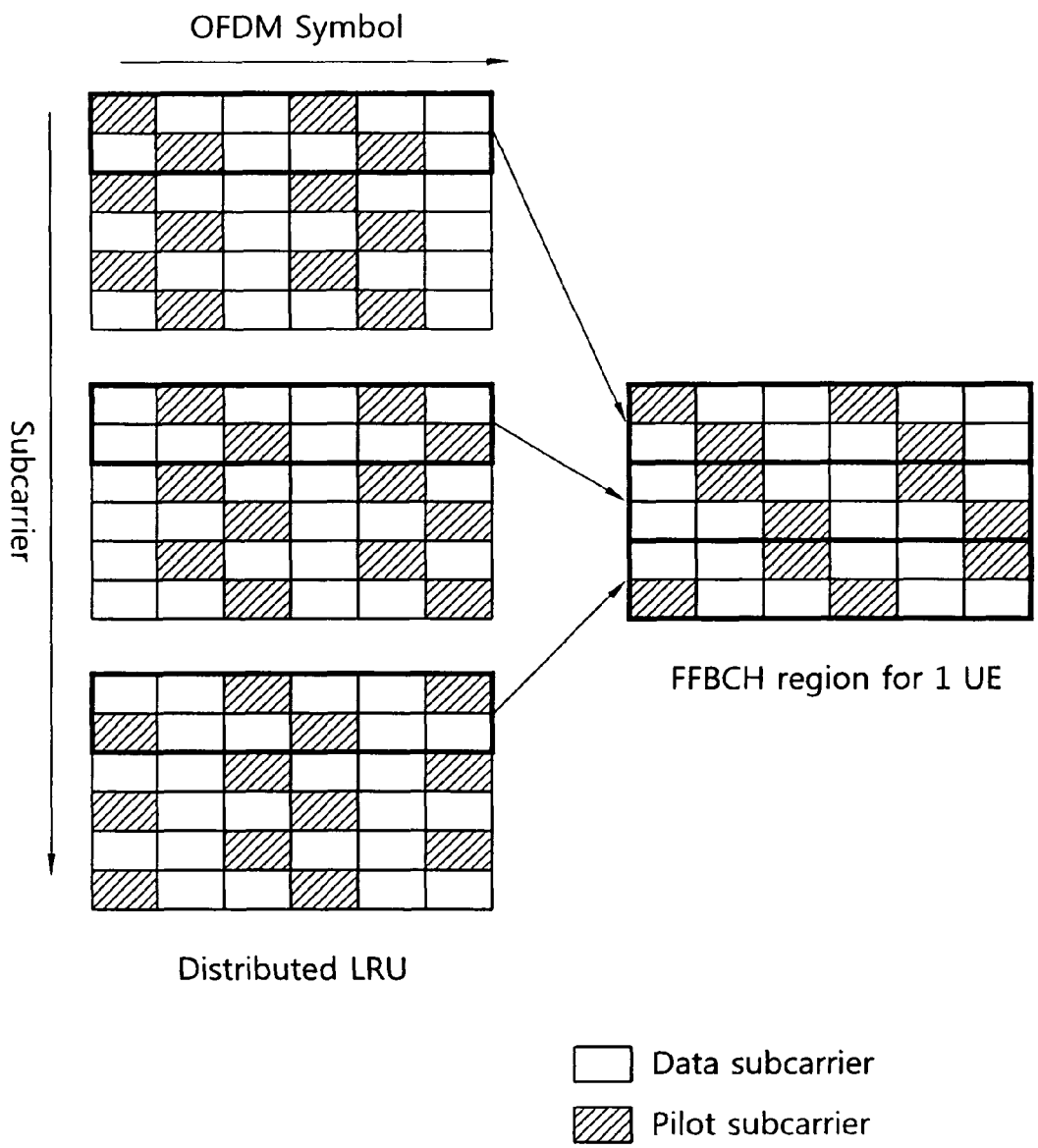
FIG. 25 shows an FFBCH according to another embodiment of the present invention.
Figure 26:
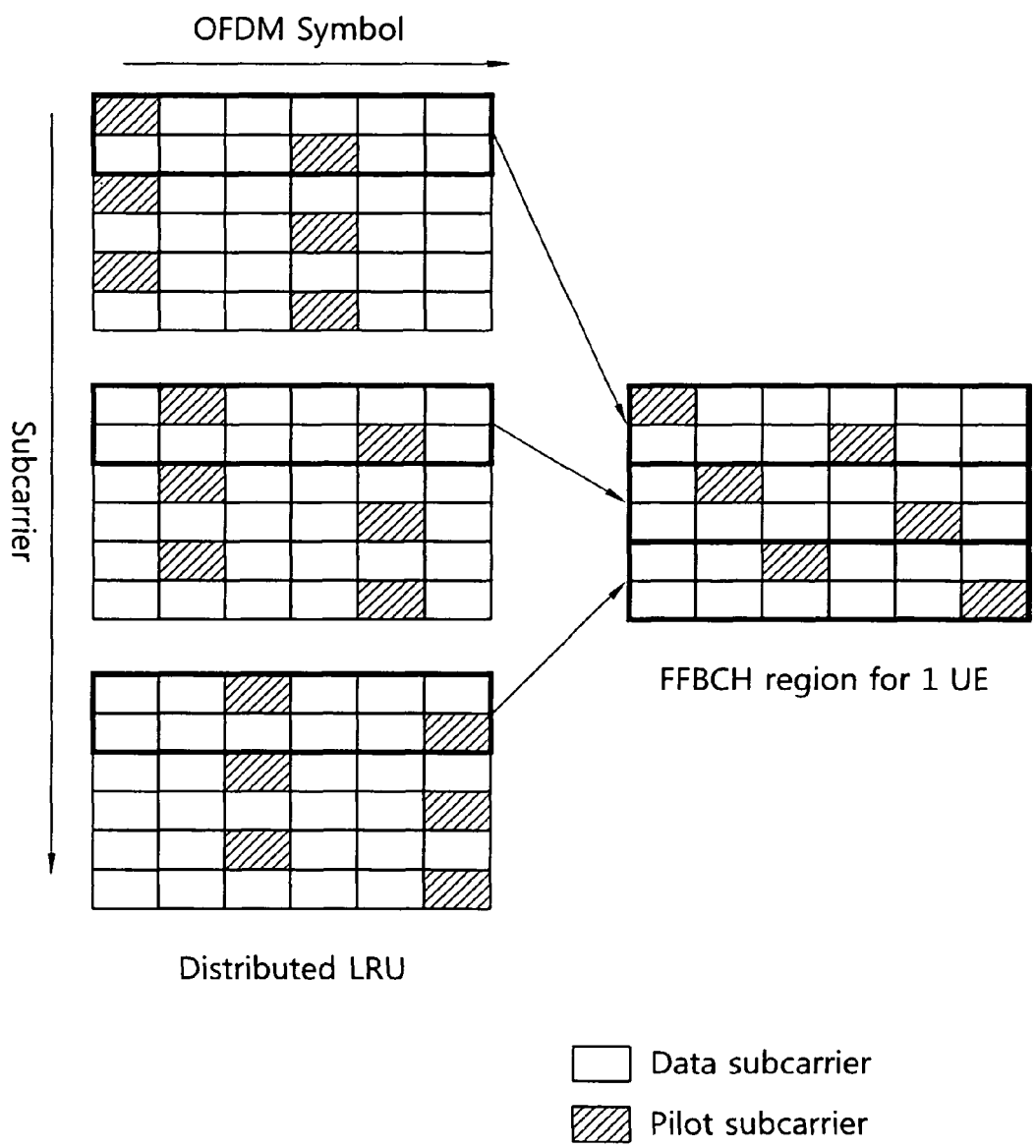
FIG. 26 shows an FFBCH according to another embodiment of the present invention.

FIG. 22 shows an FFBCH according to another embodiment of the present invention. FIG. 23 shows an FFBCH according to another embodiment of the present invention. FIG. 24 shows an FFBCH according to another embodiment of the present invention. FIG. 25 shows an FFBCH according to another embodiment of the present invention. FIG. 26 shows an FFBCH according to another embodiment of the present invention.

Referring to FIG. 22 to FIG. 26, a position of a pilot subcarrier is changed in comparison with FIG. 21. Although the position of the pilot subcarrier is changed, a pilot subcarrier structure of a tile of a DRU may be cyclically changed, and thus a mini-tile is selected such that an identical number of pilots are allocated to each OFDM symbol of the FFBCH for one UE.

Figure 27:
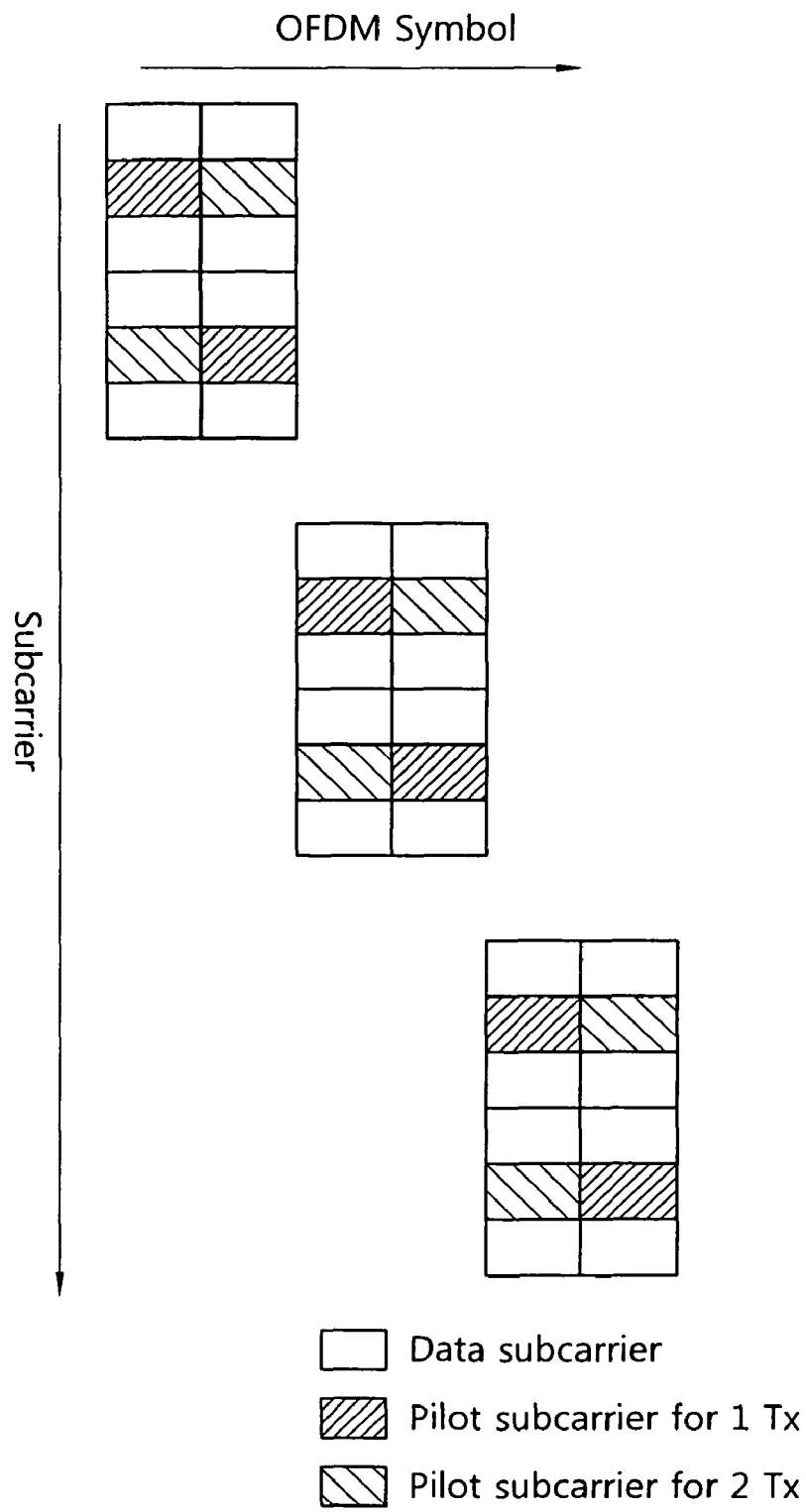
FIG. 27 shows a control channel in a multiple antenna system according to an embodiment of the present invention.
Figure 28:
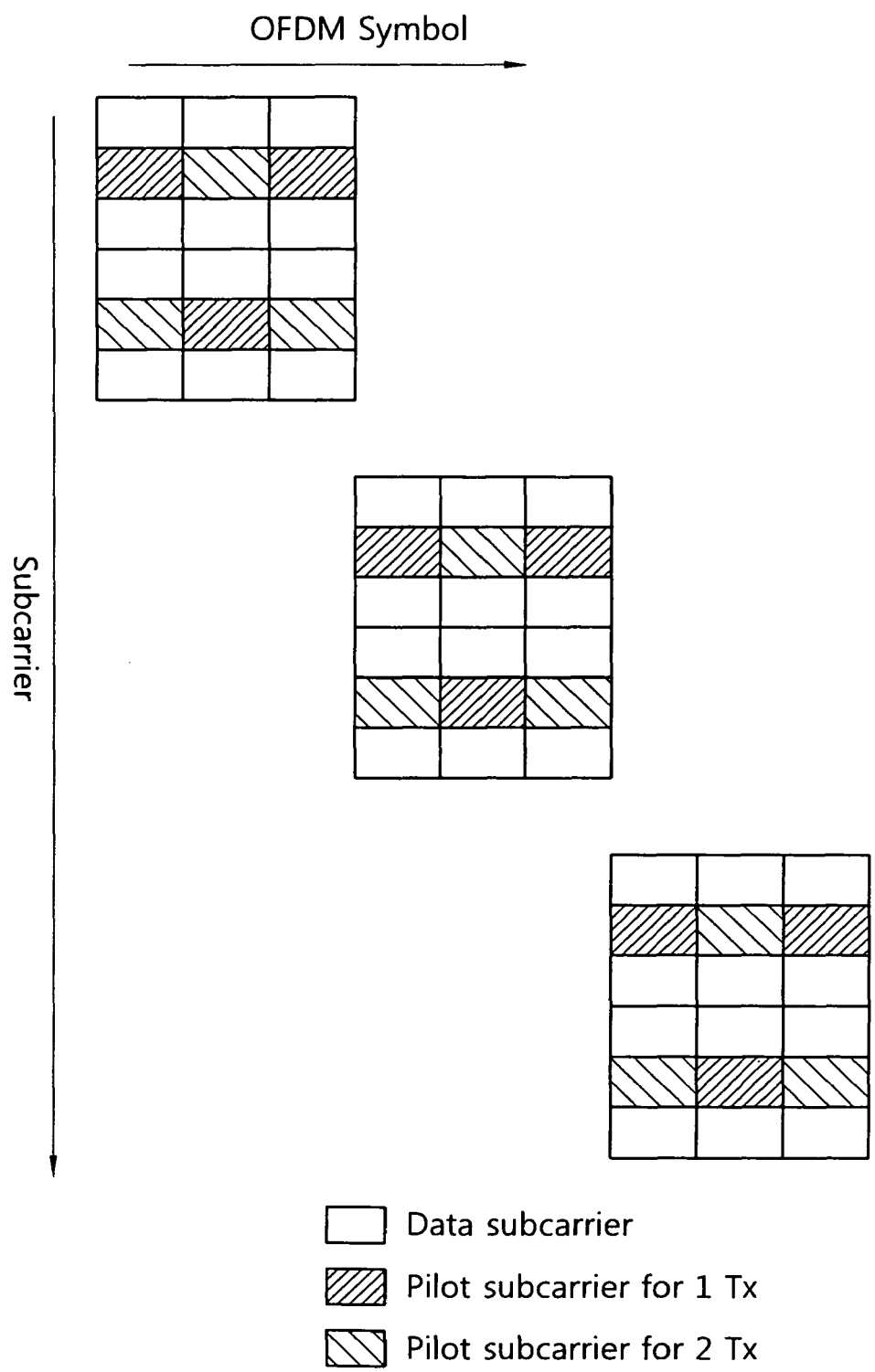
FIG. 28 shows a control channel in a multiple antenna system according to another embodiment of the present invention.
Figure 29:
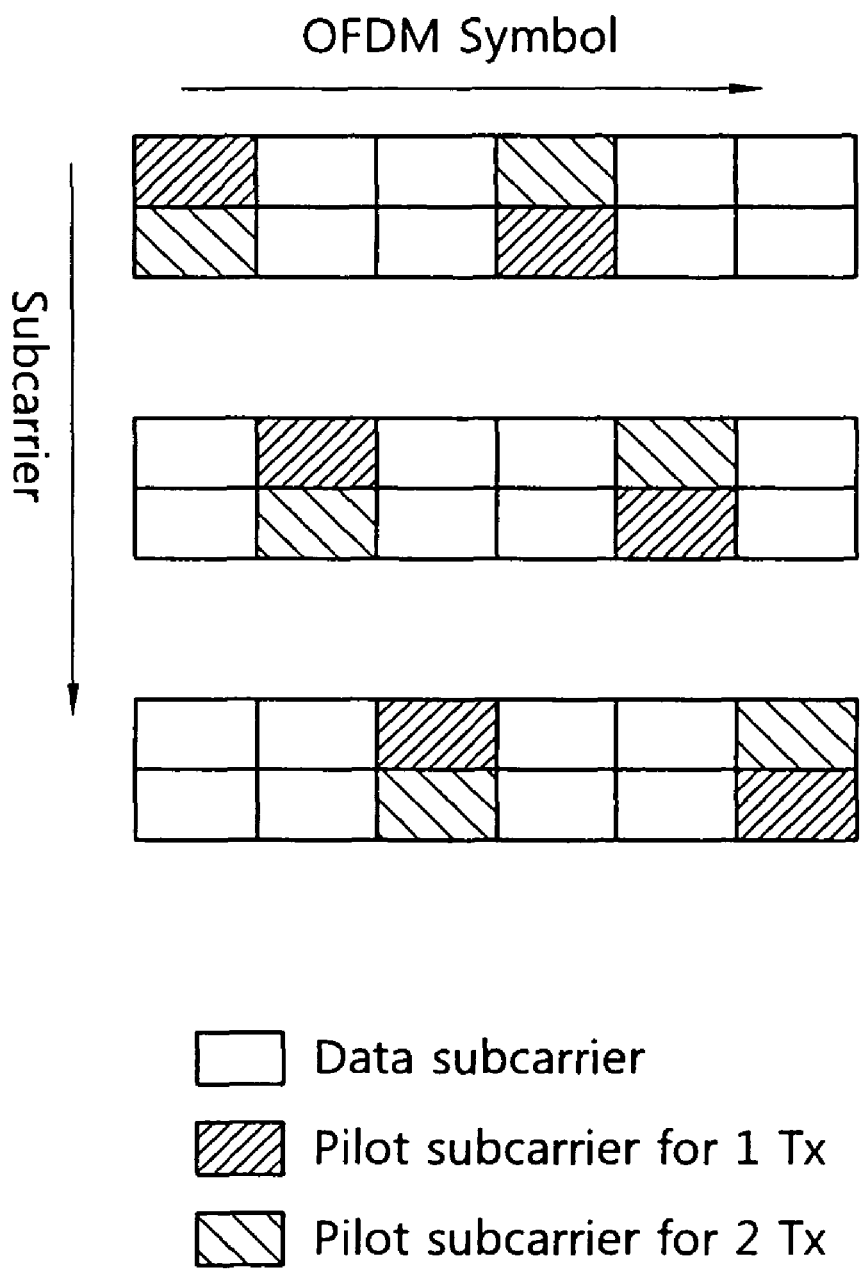
FIG. 29 shows a control channel in a multiple antenna system according to another embodiment of the present invention.

FIG. 27 shows a control channel in a multiple antenna system according to an embodiment of the present invention. FIG. 28 shows a control channel in a multiple antenna system according to another embodiment of the present invention. FIG. 29 shows a control channel in a multiple antenna system according to another embodiment of the present invention.

Referring to FIG. 27 to FIG. 29, a pilot subcarrier may be allocated to the control channel irrespective of antennas in a case where channel estimation for each antenna is not necessary such as in cyclic delay diversity (CDD) transmission in which data for each antenna is transmitted with a cyclic delay. If channel estimation for each antenna is not necessary, a plurality of pilot subcarriers included in the control channel can be identified by a pilot subcarrier for each antenna. Alternatively, pilot subcarriers for an increasing number of antennas may be added to the control channel. For example, in a system using two antennas, the control channel may include a pilot subcarrier for a first antenna and a pilot subcarrier for a second antenna. A pilot for channel estimation of the first antenna is mapped to the pilot subcarrier for the first antenna. A pilot for channel estimation of the second antenna is mapped to the pilot subcarrier for the second antenna. The pilot for the second antenna may be punctured when data is transmitted through the first antenna. The pilot for the first antenna may be punctured when data is transmitted through the second antenna.

A pilot subcarrier for each antenna in multiple antennas can be allocated such that an identical number of pilot subcarriers are allocated to each OFDM symbol. For example, in a case where a mini-tile constituting a control channel or a tile of the control channel consists of two OFDM symbols and six subcarriers as shown in FIG. 27 and in a case where the mini-tile consists of three OFDM symbols and six subcarriers as shown in FIG. 28, one pilot subcarrier for the first antenna and one pilot subcarrier for the second antenna are allocated to each OFDM symbol. Meanwhile, in a case where a less number of subcarriers are included in a frequency domain as shown in FIG. 26 in which the mini-tile constituting the control channel or the tile of the control channel consists of six OFDM symbols and two subcarriers, the pilot subcarrier for each antenna in the multiple antennas can be allocated to a specific OFDM symbol.

It is shown herein that the mini-tile constituting the tile of the control channel or the tile of the control channel consists of two OFDM symbols and six subcarriers in FIG. 27, or three OFDM symbols and six subcarriers in FIG. 28, or six OFDM symbols and two subcarriers in FIG. 29. However, this is for exemplary purposes only, and thus the mini-tile constituting the control channel or the tile of the control channel may have the control channel structure or FFBCH structure described above, and a pilot subcarrier allocated to each mini-tile can be used by being identified by a pilot subcarrier for each antenna.

The aforementioned arrangement of the pilot subcarriers included in the control channel and the FFBCH are for exemplary purposes only. The number of pilot subcarriers and positions thereof can change variously according to the number of antennas, a transmission scheme, etc.

A control channel region can be configured in various manners, and a control signal can be adaptively transmitted in various channel environments.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of transmitting a control signal in a wireless communication system, the method comprising:
receiving data or a control signal; and
transmitting a feedback signal through a control channel in response to the data or the control signal,
wherein the control channel comprises a plurality of mini-tiles in a plurality of tiles, each of the plurality of mini-tiles consists of at least two contiguous orthogonal frequency division multiplexing (OFDM) symbols in a time domain and at least two contiguous subcarriers in a frequency domain, and the plurality of mini-tiles contain different pilot patterns so that an identical number of pilots are allocated to each OFDM symbol of the control channel,
wherein a single pilot is allocated to each OFDM symbol of the control channel and the single pilot is allocated to each group of subcarriers to be transmitted via same frequency bands of the control channel.

2. The method of claim 1, wherein the plurality of mini-tiles are selected from a logical distributed resource unit (DRU) comprising the plurality of tiles, the data is user data, and the feedback signal is an acknowledgment (ACK)/non-acknowledgment (NACK) signal determined according to whether an error occurs in the user data.

3. The method of claim 1, wherein transmit power per symbol is maintained to be constant.

4. The method of claim 1, wherein the data or the control signal is a channel state report request message indicating channel measurement and channel state report, and the feedback signal is a channel quality indicator (CQI) for the channel state report.

5. The method of claim 1, wherein the data or the control signal is a channel state report request message indicating channel measurement and channel state report, and the feedback signal is information regarding data transmission using multiple antennas and including a precoding matrix indicator (PMI).

6. The method of claim 1, wherein the mini-tile consists of six contiguous OFDM symbols in a time domain and two contiguous subcarriers in a frequency domain, and the tile consists of three mini-tiles.

7. The method of claim 1, wherein a first mini-tile consists of first six contiguous subcarriers to be transmitted via first frequency bands and second six contiguous subcarriers to be transmitted via second frequency bands, in the first six contiguous subcarriers a first pilot subcarrier is followed by five data subcarriers, and in the second six contiguous subcarriers three data subcarriers are followed by a second pilot subcarrier which is followed by two data subcarriers, wherein a second mini-tile consists of third six contiguous subcarriers to be transmitted via third frequency bands and fourth six contiguous subcarriers to be transmitted via fourth frequency bands, in the third six contiguous subcarriers a data subcarrier is followed by a third pilot subcarrier which is followed by four data subcarriers, and in the fourth six contiguous subcarriers four data subcarriers are followed by a fourth pilot subcarrier which is followed by a data subcarrier, wherein a third mini-tile consists of fifth six contiguous subcarriers to be transmitted via fifth frequency bands and sixth six contiguous subcarriers to be transmitted via sixth frequency bands, in the fifth six contiguous subcarriers two data subcarriers are followed by a fifth pilot subcarrier which is followed by three data subcarriers, and in the sixth six contiguous subcarriers five data subcarriers are followed by a sixth pilot subcarrier.

8. The method of claim 1, wherein the plurality of mini-tiles are generated from the plurality of tiles, and the plurality of mini-tiles are cyclically selected from the plurality of tiles when the plurality of tiles have a same pilot pattern.

9. The method of claim 1, wherein the plurality of mini-tiles are generated from the plurality of tiles, and the plurality of mini-tiles are selected at a same position from the plurality of tiles when the plurality of tiles have cyclically-arranged pilot patterns.

10. A mobile terminal in a wireless communication system, the terminal comprising:

a receiver configured for receiving data or a control signal; and a transmitter configured for transmitting a feedback signal through a control channel in response to the data or the control signal, wherein the control channel comprises a plurality of mini-tiles in a plurality of tiles, each of plurality of mini-tiles consists of at least two contiguous orthogonal frequency division multiplexing (OFDM) symbols in a time domain and at least two contiguous subcarriers in a frequency domain, and the plurality of mini-tiles contain different pilot patterns so that an identical number of pilots are allocated to each OFDM symbol of the control channel, wherein a single pilot is allocated to each OFDM symbol of the control channel and the single pilot is allocated to each group of subcarriers to be transmitted via same frequency bands of the control channel.

11. The terminal of claim 10, wherein transmit power per symbol is maintained to be constant.

12. The terminal of claim 10, wherein the mini-tile consists of six OFDM symbols in a time domain and two subcarriers in a frequency domain, and the tile consists of three mini-tiles.

13. The terminal of claim 12, wherein a first mini-tile consists of first six contiguous subcarriers to be transmitted via first frequency bands and second six contiguous subcarriers to be transmitted via second frequency bands, in the first six contiguous subcarriers a first pilot subcarrier is followed by five data subcarriers, and in the second six contiguous subcarriers three data subcarriers are followed by a second pilot subcarrier which is followed by two data subcarriers, wherein a second mini-tile consists of third six contiguous subcarriers to be transmitted via third frequency bands and fourth six contiguous subcarriers to be transmitted via fourth frequency bands, in the third six contiguous subcarriers a data subcarrier is followed by a third pilot subcarrier which is followed by four data subcarriers, and in the fourth six contiguous subcarriers four data subcarriers are followed by a fourth pilot subcarrier which is followed by a data subcarrier, wherein a third mini-tile consists of fifth six contiguous subcarriers to be transmitted via fifth frequency bands and sixth six contiguous subcarriers to be transmitted via sixth frequency bands, in the fifth six contiguous subcarriers two data subcarriers are followed by a fifth pilot subcarrier which is followed by three data subcarriers, and in the sixth six contiguous subcarriers five data subcarriers are followed by a sixth pilot subcarrier.

14. The terminal of claim 10, wherein the plurality of mini-tiles are generated from the plurality of tiles, and the plurality of mini-tiles are cyclically selected from the plurality of tiles when the plurality of tiles have a same pilot pattern.

15. The terminal of claim 10, wherein the plurality of mini-tiles are generated from the plurality of tiles, and the plurality of mini-tiles are selected at a same position from the plurality of tiles when the plurality of tiles have cyclically-arranged pilot patterns.

* * * * *